(12) United States Patent
Miyahara et al.

(10) Patent No.: US 9,006,585 B2
(45) Date of Patent: Apr. 14, 2015

(54) DEVICE FOR SURFACE MOUNTING AND CAPACITOR ELEMENT

(71) Applicants: Rubycon Corporation, Ina-shi (JP); Rubycon Carlit Co., Ltd., Ina-shi (JP)

(72) Inventors: Takuya Miyahara, Ina (JP); Tetsuo Shiba, Ina (JP)

(73) Assignees: Rubycon Corporation, Nagano (JP); Rubycon Carlit Co., Ltd., Nagano (JP); Carlit Holdings Co., Ltd., Tokyo (JP)

( * ) Notice: Subject to any disclaimer, the term of this patent is extended or adjusted under 35 U.S.C. 154(b) by 0 days.

(21) Appl. No.: 14/336,518

(22) Filed: Jul. 21, 2014

(65) Prior Publication Data
US 2014/0326492 A1 Nov. 6, 2014

Related U.S. Application Data

(62) Division of application No. 13/321,049, filed as application No. PCT/JP2010/003373 on May 19, 2010, now Pat. No. 8,803,000.

(30) Foreign Application Priority Data

May 19, 2009 (JP) .................................. 2009-121303
Jun. 26, 2009 (JP) .................................. 2009-152193
Jun. 30, 2009 (JP) .................................. 2009-155113

(51) Int. Cl.
*H05K 1/16* (2006.01)
*H01G 11/82* (2013.01)
(Continued)

(52) U.S. Cl.
CPC ................. *H01G 11/82* (2013.01); *H01G 2/06* (2013.01); *H01G 9/012* (2013.01); *H01G 9/15* (2013.01); *H01G 11/04* (2013.01); *H01G 11/74* (2013.01)

(58) Field of Classification Search
CPC ............ H01G 2/06; H01G 9/012; H01G 9/15
USPC .......... 174/260, 261; 361/760, 763, 766, 540, 361/528–535
See application file for complete search history.

(56) References Cited

U.S. PATENT DOCUMENTS 5,962,917 A * 10/1999 Moriyama .................... 257/697
6,282,079 B1 8/2001 Nagakari et al.
(Continued)

FOREIGN PATENT DOCUMENTS

JP 2000-150290 A 5/2000
JP 2001-102252 A 4/2001
(Continued)

OTHER PUBLICATIONS

International Search Report (PCT/ISA/210) issued on Aug. 24, 2010, by Japanese Patent Office as the International Searching Authority for International Application No. PCT/JP2010/003373.
(Continued)

*Primary Examiner* — Yuriy Semenenko
(74) *Attorney, Agent, or Firm* — Buchanan Ingersoll & Rooney PC

(57) ABSTRACT

There is provided a device (1) for surface mounting that has a substrate (10) and a capacitor element loaded on a loading-side surface of the substrate and is integrally molded including the substrate (10) and the capacitor element using a packaging resin. The substrate (10) includes a first terminal electrode (51) electrically connected to a first electrode of the capacitor element and a second terminal electrode (52) electrically connected to a second electrode of the capacitor element, at least part of a mounting-side surface (12) on an opposite side to the loading-side surface of the substrate (10) is exposed on a mounting surface (2) of the device (1), and the first terminal electrode (51) and the second terminal electrode (52) are adjacently disposed around an entire circumference of the mounting surface (2) of the device (1).

11 Claims, 20 Drawing Sheets

(51) Int. Cl.
*H01G 2/06* (2006.01)
*H01G 9/012* (2006.01)
*H01G 9/15* (2006.01)
*H01G 11/04* (2013.01)
*H01G 11/74* (2013.01)

(56) References Cited

U.S. PATENT DOCUMENTS

| | | |
|---|---|---|
| 6,920,037 B2 | 7/2005 | Sano et al. |
| 8,062,385 B2 * | 11/2011 | Chacko .................. 29/25.03 |
| 8,315,035 B2 | 11/2012 | Togashi et al. |
| 2002/0163775 A1 | 11/2002 | Maeda |
| 2006/0056136 A1 | 3/2006 | Fujii et al. |
| 2006/0109609 A1 | 5/2006 | Kobayashi et al. |
| 2006/0215380 A1 * | 9/2006 | Lu et al. .................. 361/763 |
| 2006/0285276 A1 | 12/2006 | Kuriyama |
| 2008/0291606 A1 | 11/2008 | Takahashi et al. |
| 2009/0073639 A1 * | 3/2009 | Ishizuka et al. ............ 361/523 |
| 2012/0018206 A1 * | 1/2012 | Suenaga et al. ............ 174/260 |

FOREIGN PATENT DOCUMENTS

| | | |
|---|---|---|
| JP | 2001-244145 A | 9/2001 |
| JP | 2002-367862 A | 12/2002 |
| JP | 2006-080423 A | 3/2006 |
| JP | 2008-235425 A | 10/2008 |
| JP | 2008-294012 A | 12/2008 |
| JP | 2009-059742 A | 3/2009 |
| JP | 2009059742 * | 3/2009 |
| WO | WO 03/107365 A1 | 12/2003 |
| WO | WO 2005/015588 A1 | 2/2005 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Dec. 22, 2011, in the corresponding International Application No. PCT/JP2010/003373. (11 pages).

* cited by examiner

DEVICE FOR SURFACE MOUNTING AND CAPACITOR ELEMENT

CROSS-REFERENCE TO RELATED APPLICATIONS

The present application is a divisional of U.S. Ser. No. 13/321,049, filed on Feb. 2, 2012, and which is a national stage application of PCT/JP2010/003373, which was filed on May 19, 2010, and which claims the priority of JP 2009-121303, filed on May 19, 2008; JP 2009-152193, filed on Jun. 26, 2009; and JP 2009-155113, filed on Jun. 30, 2009. The subject matter of PCT/JP2010/003373; JP 2009-121303; JP 2009-152193; and JP 2009-155113 are incorporated herein by reference.

TECHNICAL FIELD

The present invention relates to a capacitor element, a capacitor unit, and a mounted device in which such element and unit are incorporated, those are used in various electronic appliances.

BACKGROUND ART

Japanese Laid-Open Patent Publication No. 2006-80423 (Document 1) discloses a technology that relates to a chip-type solid electrolytic capacitor and aims to provide a chip-type solid electrolytic capacitor with improved ESL properties and is capable of a further reduction in ESL. The chip-type solid electrolytic capacitor according to Document 1 includes: a capacitor element; an anode lead frame that has an anode joining portion to be joined to an anode portion of the capacitor element provided at one end of a flat portion thereof and has an anode terminal portion for mounting purposes provided on a lower surface thereof; and a cathode lead frame provided with a flat portion, which has a cathode portion of the above capacitor element placed thereupon and joined thereto and is loaded on the flat portion of the above anode lead frame with an insulating layer in between, and a cathode terminal portion for mounting purposes provided on the lower surface thereof. With this chip-type solid electrolytic capacitor, the direction of the current flowing in the cathode lead frame and the direction of the current flowing in the anode lead frame are opposite and cancel each other out, making a large reduction in ESL possible.

In Japanese Laid-Open Patent Publication No. 2001-102252 (Document 2), a technology that provides a small, large-capacity chip capacitor is disclosed. Document 2 discloses a method of manufacturing a solid electrolytic capacitor where a capacitor element, which has an anode lead exposed at one end and a cathode formed on an outer circumferential surface, is sealed with resin, wherein to improve the volume ratio of the capacitor element in the finished capacitor product a plus electrode and a minus electrode are present on both the inner and outer surfaces thereof, the capacitor element is stuck onto an inner surface of a circuit board where electrodes of the same type are connected by through-holes to electrically connect the minus electrode of such surface and the cathode of the capacitor element and also join the anode lead of the capacitor element to the plus electrode, and then the capacitor element is sealed with resin so as to expose the outer surface of the circuit board.

SUMMARY

As increasingly high frequencies have become used for electronic appliances, for capacitors that are electronic components, demand has increased for capacitors with superior impedance characteristics in a high frequency region. Solid electrolytic capacitors are often used in the periphery of a CPU of a personal computer or the like. A solid electrolytic capacitor is one type of capacitor that is small and achieves a large capacity, and is constructed by forming a dielectric oxide film on the surface of metal foil such as aluminum for having valve effect (valve action), separating an anode portion and a cathode portion, and successively forming (laminating) a solid electrolyte layer composed of a conductive polymer and a cathode electrode on the cathode portion of the dielectric oxide film. In addition to being small and having a large capacity, to achieve superior performance regarding noise reduction and transient response that are important to use of increasingly high frequencies, a capacitor used in the periphery of a CPU of an electronic appliance needs to have a low ESR (Equivalent Series Resistance) and a low ESR (Equivalent Series Inductance).

One method of achieving a low ESL for a chip-type sur-face-mounted device equipped with a capacitor element such as a solid electrolytic capacitor is to provide the anode terminal and the cathode terminal on the same surface and shorten the current path (i.e., suppress the loop area) by disposing such terminals adjacently within a range where they can still be insulated. Another method of achieving a low ESL is to increase the number of terminals and diversify the directions in which current flows.

One aspect of the present invention is a device for surface-mounting including a substrate and a capacitor element loaded on a loading-side surface of the substrate, the device being integrally molded including the substrate and the capacitor element using a packaging resin.

The substrate includes a first terminal electrode electrically connected to a first electrode portion of the capacitor element and a second terminal electrode electrically connected to a second electrode portion of the capacitor element. In addition, at least part of a mounting-side surface on an opposite side to the loading-side surface of the substrate is exposed on a mounting surface of the device, and the first terminal electrode and the second terminal electrode are adjacently disposed around an entire circumference of the mounting surface of the device. With this device, the first terminal electrode and the second terminal electrode appear in an adjacent state around the entire circumference of the mounting surface so as to be externally connectable, and the entire circumference of the mounting surface of the device is effectively formed by at least one of the first terminal electrode and the second terminal electrode.

With this device, the entire circumference of the mounting surface of the device, that is, for a square or rectangular device, an entire quadrangular ring-like-shaped peripheral part including the sides (edges) and corners in the four directions of the quadrangular mounting surface is effectively set as a terminal electrode part, and such quadrangular ring-like-shaped terminal electrode part is divided into one or plurality of first terminal electrodes, typically one or plurality of anode terminals, and one or plurality of second terminal electrodes, typically one or plurality of cathode terminals. Since the terminal electrodes are adjacently disposed around the entire circumference of the mounting surface of the device, it is possible to shorten the current path and to also diversify the direction of current flowing inside the device. Accordingly, it is possible to suppress the ESL of the device. Also, since it is possible to dispose the terminal electrodes around the entire circumference of the device, there is flexibility with regard to the wiring patterns of printed circuit boards on which the device is mounted.

The substrate should preferably be a laminated substrate (printed circuit type). Although, the substrate may be a lead frame type, a lead frame of a complex shape will sometimes be needed in order to dispose the first and second terminal electrodes around the entire circumference of the mounting surface of the device. If the substrate is a printed circuit type, by patterning the electrodes formed around the entire circumference of the substrate, it is easy to form the first and second terminal electrodes that appear around the entire circumference of the mounting surface of the device. That is, in a state where the first terminal electrodes and the second terminal electrodes are next to one another (i.e., disposed in an adjacent state) around at least the entire circumference of the mounting side surface of the substrate, it is preferable for the first terminal electrodes and the second terminal electrodes to be formed so as to effectively cover the entire circumference of the mounting-side surface of the substrate.

The capacitor element may be a solid electrolytic capacitor element including base of valve effect, an electrolytic solution-type capacitor element, a ceramic-type capacitor element, or a film type capacitor element. A solid electrolytic capacitor is one type of capacitor that can achieve a large capacity with a small size, and is one type of capacitor element suited to this device.

In addition, the capacitor element should preferably include a plate-like base of valve effect; a first functional layer provided on a first surface of the base; a second functional layer provided on a second surface of the base; a first insulating layer that covers a circumferential edge of the first functional layer on the first surface; a second insulating layer that covers a circumferential edge of the second functional layer on the second surface; and at least one through-hole that passes through the base. The base includes the first surface facing an opposite side to the substrate and the second surface that faces the substrate. The first functional layer is a layer formed on the first surface of the substrate and includes a dielectric oxide film, a solid electrolyte layer, and an electrode layer laminated in that order on the first surface. The second functional layer is a functional layer formed on the second surface of the base and includes a dielectric oxide film, a solid electrolyte layer, and an electrode layer laminated in that order on the second surface. The capacitor element includes a third functional layer including a dielectric oxide film, a solid electrolyte layer, and an electrode layer laminated in that order from a side that contacts the base provided on an inner circumferential surface of the at least one through-hole, and the electrode layer of the third functional layer electrically connects the electrode layer of the first functional layer and the electrode layer of the second functional layer. The first electrode portion is formed by at least part of the first surface of the base being exposed on an outer circumferential side of the first insulating layer, and the second electrode portion is formed by at least part of the electrode layer of the first functional layer, the electrode layer of the second functional layer, and the electrode layer of the third functional layer.

In this capacitor element, the electrode layer of the first functional layer and the electrode layer of the second functional layer can be electrically connected by the electrode layer of the third functional layer provided on the through-holes. Accordingly, it is possible to electrically connect the electrode layers provided on both surfaces of a base of valve effect by a structure inside the base. These electrode layers are typically cathodes. Note that for an electrode layer that typically functions as a cathode, the solid electrolyte layer is given the role of functioning as the actual cathode.

In addition, by providing the third functional layer on an inner circumferential surface of the through-hole, it is possible to form a layer that functions as a solid electrolytic capacitor on the inner circumferential surface of the through-hole. This means that it is possible to suppress a drop in capacity due to the drop in the area of the first surface (upper surface) and a second surface (lower surface) due to the through-holes provided in the base. Accordingly, the electrical connection between the electrode layers (typically the cathode portions (cathodes)) formed on the upper surface and lower surface can be improved with a simple construction and a drop in the area of the electrode layers can also be suppressed.

A typical base (base metal, base substrate) for having valve-effecting is aluminum, but another metal base that can have valve effect, such as tantalum may be used.

This device preferably has a plurality of capacitor elements that are stacked in a direction perpendicular to the loading-side surface of the substrate. That is, the device should preferably have a capacitor unit in which a plurality of capacitor elements are disposed so as to be stacked in the first direction.

The respective elements of the plurality of capacitor elements include: a plate-like base of valve effect and including a first surface facing an opposite side to the substrate and a second surface that faces the substrate, a first functional layer including a dielectric oxide film, a solid electrolyte layer, and an electrode layer laminated in that order on the first surface of the base; and a second functional layer including a dielectric oxide film, a solid electrolyte layer, and an electrode layer laminated in that order on a second surface of the base. The first electrode portion of each capacitor element includes parts formed on the four corners of the first surface of the base of each element that are exposed in the perpendicular direction to the other elements out of the plurality of capacitor elements and the second electrode portion of each element is formed by at least part of the electrode layer of the first functional layer and the electrode layer of the second functional layer.

In the capacitor unit, the four corners of the first surface of each of the elements that are stacked (laminated) are exposed to the other elements in the perpendicular direction (first direction) in which the elements are laminated. Accordingly, the four corners of the first surfaces of the respective elements can be accessed from the perpendicular direction without being overlapped by the corners of other elements. This means it is possible to set the four corners of the first surface of the respective elements as the first electrode portions and to connect the first electrode portions and the substrate using a variety of methods from the perpendicular direction (the first direction) to such first electrode portions. Accordingly, it is possible to provide a device in which a plurality of capacitor elements are laminated, where it is easy to electrically connect to the respective elements, where connection problems and the like are unlikely to occur, and the device has a low cost, high reliability, and a large capacity. The first electrode portions are typically anodes and typical connection methods are wire bonding or a lead frame.

In addition, in this device, the plurality of elements are stacked so that the four corners of the respective elements are exposed in different directions. Accordingly, in the respective elements, current typically flows in four directions and in the device, current flows in even more directions. This makes it easy for magnetic fields to cancel each other out and to provide a device with a low ESL.

Also, in this device, the plurality of elements are stacked with the four corners of the respective elements exposed in different directions. This means that it is easy to construct a device equipped with a large number of connecting electrodes where it is easy to dispose bonding wires and a lead frame in a variety of directions.

In addition, in this device, the plurality of elements are stacked with the four corners of the respective elements exposed in different directions. Accordingly, the majority of the bases of the respective elements are laminated on one another. This means that it is possible to supply a device where a large number of electrode portions are exposed at the periphery, where there is high space efficiency, and that is stabilized with a symmetrical (rotationally symmetrical) form when viewed from the perpendicular direction (the first direction). Accordingly, it is possible to provide a device that is compact, has a large capacity, has a low ESR and a low ESL, is also easy to connect to a substrate or a lead frame, and where it is easy to increase the number of electrodes.

The substrate should preferably include one or plurality of first connecting electrode that are electrically connected to the first electrode portions of the capacitor element and one or plurality of second connecting electrodes that are electrically connected to the second electrode portion or portions of the capacitor element. The first connecting electrodes are provided at positions on the loading-side surface of the substrate opposite (corresponding to) the first terminal electrodes on the mounting-side surface. The second connecting electrodes are provided at positions opposite (corresponding to) the second terminal electrodes on the mounting-side surface. Also, the first terminal electrodes and the first connecting electrodes, and the second terminal electrodes and the second connecting electrodes, respectively, are connected by through electrodes (through holes) that pass through the substrate. The capacitor element loaded on the substrate and the first and second connecting electrodes on the surface on the loading-side of the substrate can be connected by wire bonding or a conductive member such as conductive paste.

In this device, it is possible to connect the first electrode portion and the first connecting electrode by wire bonding (bonding wires). The second electrode portion and the second connecting electrode can be connected directly or via conductive paste.

In a typical device, the first electrode portions are the anodes of the capacitor element, the second electrode portion is the cathode of the capacitor element, and the second terminal electrodes are cathode terminals. Accordingly, by making the area of the second terminal electrodes larger than the area of the first terminal electrodes, it is easy to achieve a shielding effect by the second terminal electrodes. To increase the area, it is possible for the second terminal electrodes to extend toward the center of the substrate. The second terminal electrodes on the mounting-side surface of the substrate may be covered with packaging resin or an insulating masking member, aside from at the periphery of the substrate. It is also effective to form the second terminal electrode continuously around the circumferential edge of the substrate.

The plurality of first and second terminal electrodes may appear alternately around the entire circumference of the device. The plurality of first terminal electrodes may appear in parts including the four corners of the mounting surface and the plurality of second terminal electrodes may appear at the four sides or edges of the mounting surface. The corner parts of the mounting surface can also be used as terminal electrodes. The plurality of second terminal electrodes may appear in parts including two opposite sides or edges and the four corners of the mounting surface. If the second terminal electrodes are cathode terminals, by disposing the cathode terminals on opposite edges on both sides of the anode terminals, it is easy to dispose the cathode terminals so as to straddle power supply lines.

The second terminal electrode may appear continuously around the entire circumference of the device and the first terminal electrode may appear on the inside of the second terminal electrode. The plurality of first terminal electrodes may appear so as to be surrounded by the second terminal electrode. If the second terminal electrode is a cathode terminal, since the anode terminals are surrounded by the cathode terminal, it is easy to shield noise generated at the mounting substrate.

With the capacitor element in which the electrode layer of the first functional layer and the electrode layer of the second functional layer are connected by the electrode layer of the third functional layer, it is not necessary to electrically connect the electrode layer of the first functional layer and the electrode layer of the second functional layer using the periphery (the circumferential edge part) of the base. Accordingly, it is possible to dispose the first electrode portions (typically anode portions (anodes)) separated by the electrode layer and the insulating layer of the capacitor element intermittently around the entire circumference of the circumferential side or edge of the base. Such capacitor element is suited to loading on the device. The first electrode portion can be continuously or intermittently disposed around the entire circumference of the circumferential edge of the base and it is possible to significantly improve the flexibility with respect to the wiring patterns of substrates on which the capacitor element is loaded.

In addition, by connecting cathodes provided on both surfaces of the base with the inner portion that is almost located at the center of the base and passes through the base, and disposing the anodes intermittently or continuously on the circumferential side or edge of the base, the distances between the electrodes in the capacitor element are reduced. This means it is easy to reduce the ESR, and since it is possible to diversify the direction in which current flows in the capacitor element, it is easy to reduce the ESL. It is also possible to provide a capacitor element that is small and has a large capacity, has a low ESR and a low ESL, and is able to flexibly cope with the layout of connecting terminals, and also a device on which such capacitor element has been loaded.

At least one through-hole should preferably be provided at the center of the base. It is possible to suppress fluctuations in the distance between the third functional layer provided on the through-hole and the first electrode portion disposed along the circumferential edge of the base, and to diversify the distance in which current flows. This means it is easy to provide a capacitor element with even lower ESR and ESL and a device on which such capacitor element has been loaded. It is also effective to dispose the plurality of through-holes with line and/or point symmetry.

In a capacitor unit including a stacked plurality of capacitor elements and a device on which such capacitor unit has been loaded, by electrically connecting the electrode layer of the first functional layer of a lower capacitor element and the electrode layer of the second functional layer of an upper capacitor element, it is possible to connect the plurality of capacitor elements in parallel. The electrodes for such connecting may be electrodes that pass through the base or may be provided on the side surface of the base.

If through electrodes are used, by providing third functional layers on the inner circumferential surfaces of the through-holes that pass through the bases of the plurality of capacitor elements, it is possible to have the inner circumferential surfaces of the through-holes function as solid electrolytic capacitors. If electrodes provided on the side surface are used, by providing the third functional layers on the side surfaces of the bases of the plurality of capacitor elements, it is possible to have the side surfaces function as solid electrolytic capacitors. Accordingly, by laminating the elements out of the plurality of capacitor elements described above, it is easy to provide a capacitor unit (a laminated element structure) with an even larger capacity and a low ESR and a low ESL, and a device on which such capacitor unit has been loaded.

For the elements (capacitor elements) of the capacitor unit (laminated element structure), the first electrode portion is not limited to the four corners and may appear on the entire circumference of the first surface of the base. The first electrode portion (typically an anode portion (anode)) appears on the entire circumference of the first surface of the base and surrounds the electrode layer (typically a cathode portion (cathode)) of the first functional layer of the first surface of the base. It is possible to provide a capacitor element where the anode portion and the cathode portion are disposed at facing positions. This means the distance between the electrodes on the capacitor elements that are laminated is reduced, so that it is easy to reduce the ESR, and since the direction of current flowing in the capacitor elements that are laminated can also be diversified, it is easy to reduce the ESL. Accordingly, it is possible to provide a capacitor unit with even lower ESR and lower ESL and a device on which such capacitor unit has been loaded.

The plurality of elements may be stacked so that the four corners appear in different directions and the four corners of the first surface of elements appear around a circumference of a first circle or make a first circle (a given circle). If the respective elements have the same shape, for example, a quadrangular shape, by laminating the elements centered on one point, the four corners (typically anode portions) of the respective elements will be disposed around a given circumference of (so as to inscribe) a circle formed around the one point mentioned above. This means that it is possible to suppress eccentricity when the plurality of capacitor elements are laminated, which makes it easy to provide a capacitor unit that is balanced and has a stabilized form and a device on which such capacitor unit has been loaded.

On the various elements of the capacitor unit, the first electrode portion may appear in the four corners and additionally on two opposite sides (edges) of the first surface of the base. In such capacitor unit, the two opposite edges of the first surface of each element should appear to the other elements in a direction in which the respective elements are laminated, that is, the direction (first direction) perpendicular to the loading-side surface of the substrate.

The capacitor unit loaded on the device may include a first capacitor element and a second capacitor element disposed so as to be successively stacked in the perpendicular direction (the first direction), the second capacitor element may be smaller than the first capacitor element, and the circumferential edge of the base of the second capacitor element may be disposed inside the circumferential edge of the base of the first capacitor element. Since the entire second capacitor element is loaded in the perpendicular direction (the first direction) on the first capacitor element, the second capacitor element, including the first electrode portion, is easy to stabilize.

Other aspects of the present invention are a printed circuit board on which the above device has been mounted and an electronic appliance including such printed circuit board. According to the device described above, it is possible to provide a surface mounted-type (chip-type) with a large capacity, a low ESR, and a low ESL, which can be used together with a semiconductor device such as a CPU as a decoupling capacitor or a bypass capacitor and suppress the generation of noise. Also, the device described above is favorable for a variety of applications including a smoothing capacitor of a DC/DC power supply.

The present invention includes a capacitor element that is favorable for the device described above. Such capacitor element includes: a plate-like base for having valve effect; a first functional layer including a dielectric oxide film, a solid electrolyte layer, and an electrode layer laminated in that order on a first surface of the base; a second functional layer including a dielectric oxide film, a solid electrolyte layer, and an electrode layer laminated in that order on a second surface of the base; a first insulating layer that covers a circumferential edge of the first functional layer on the first surface; a second insulating layer that covers a circumferential edge of the second functional layer on the second surface; a first electrode portion formed by at least part of the first surface of the base being exposed on the outer circumferential side of the first insulating layer; and at least one through-hole that passes through the base. Such capacitor element is also equipped with a third functional layer, including a dielectric oxide film, a solid electrolyte layer, and an electrode layer laminated in that order from a side that contacts the base, provided on an inner circumferential surface of the at least one through-hole, and the electrode layer of the third functional layer is electrically connected to the electrode layer of the first functional layer and to the electrode layer of the second functional layer. In this capacitor element, it is preferable for the first electrode portions include portions appeared intermittently or continuously around the entire circumference of the circumferential edge of the first surface. At least one through-hole should preferably be provided in the center of the base.

The present invention further includes a capacitor unit that is favorable for the device described above. The capacitor unit includes a plurality of capacitor elements disposed so as to be stacked in the first direction. The respective capacitor elements include: a plate-like base of valve effect; a first functional layer including a dielectric oxide film, a solid electrolyte layer, and an electrode layer laminated in that order on a first surface of the base; a second functional layer including a dielectric oxide film, a solid electrolyte layer, and an electrode layer laminated in that order on a second surface of the substrate; and first electrode portions formed by parts including the four corners of the first surface of the base being exposed, wherein the four corners of the first surface of the respective elements are exposed in the first direction to the other elements out of the plurality of capacitor elements.

The present invention also includes a favorable method of manufacturing the capacitor unit described above. The elements out of the plurality of capacitor elements respectively include: a plate-like base of valve effect; a first functional layer including a dielectric oxide film, a solid electrolyte layer, and an electrode layer laminated in that order on a first surface of the base; a second functional layer including a dielectric oxide film, a solid electrolyte layer, and an electrode layer laminated in that order on a second surface of the substrate; and first electrode portions formed by parts including the four corners of the first surface of the base being exposed. The method of manufacturing the capacitor unit including the plurality of capacitor elements disposed so as to be stacked in the first direction includes a step of laminating the respective elements so that the four corners of the first surface of the respective elements are exposed in the first direction to the other elements out of the plurality of capacitor elements.

DETAIL DESCRIPTION

1. Device
1.1. Overview of Device

Figure 1:
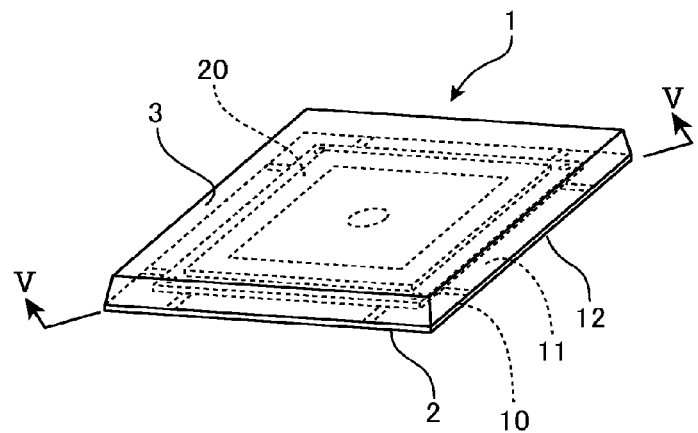
FIG. 1 is a perspective view showing an overview of a device.
Figure 2:
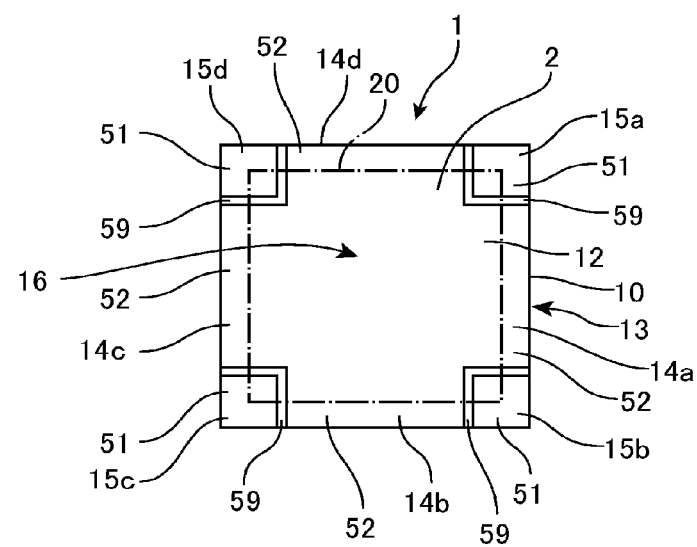
FIG. 2 is a view showing a mounting surface of the device.

FIG. 1 shows the external appearance of one example of a device according to an embodiment of the present invention. This device 1 includes a substrate 10 and a capacitor element 20 loaded on a loading-side surface 11 of the substrate 10, and is a device for surface mounting that is integrally molded in a square or rectangular form including the substrate 10 and the capacitor element 20 using packaging resin (molding resin) 3.
1.2 Substrate FIG. 2 shows a mounting surface 2 of the device 1. In the device 1, the mounting-side surface 12 of the substrate 10 is not covered by the packaging resin 3 and is exposed as the mounting surface 2. On the mounting surface 2 of the device 1, that is, the mounting-side surface 12 of the substrate 10, first terminal electrodes 51 and a second terminal electrode 52 are disposed so as to be adjacent to one another around the entire circumference 13. That is, around the four sides (edges) 14a, 14b, 14c, and 14d and the four corners 15a, 15b, 15c, and 15d of the mounting-side surface 12 of the substrate 10, the first terminal electrodes 51 and parts of the second terminal electrode 52 are formed so as to be next to one another with insulating gaps 59 in between. This means that the entire circumference 13 of the mounting-side surface 12 of the substrate 10 is effectively covered by the first terminal electrodes 51 and the parts of the second terminal electrode 52 that are formed alternately. That is, on the mounting surface 2 of the device 1, the first terminal electrodes 51 and the parts of the second terminal electrode 52 are formed around the entire circumference (in the present embodiment, the entire circumference 13 of the substrate 10), the terminal electrodes 51 and 52 appear so as to be next to one another with the insulating gaps 59 in between, and it is possible to electrically connect to connection terminals or the like provided on an external printed circuit board.

The first terminal electrodes 51 of the device 1 are anode terminals connected to first electrode portions (anodes) of the capacitor element 20. The device 1 is equipped with four anode electrodes 51 that are respectively formed in the four corners 15a to 15d of the mounting-side surface 12 of the substrate 10. The second terminal electrode 52 of the device 1 is a cathode electrode that is connected to a second electrode portion (cathode) of the capacitor element 20 and is disposed in a part that excludes the first terminal electrodes 51 on the mounting-side surface 12 of the substrate 10. That is, the cathode terminal 52 is formed so as to cover a center portion 16 and the four circumferential edges 14a to 14d of the mounting-side surface 12 of the substrate 10. The anode terminals 51 and the cathode terminal 52 are separated by the insulating gaps 59. The insulating gaps 59 are around 0.1 mm to 2 mm and more preferably around 0.2 mm to 1 mm. The gaps 59 may be empty space or may be filled with insulating resin.

Figure 3:
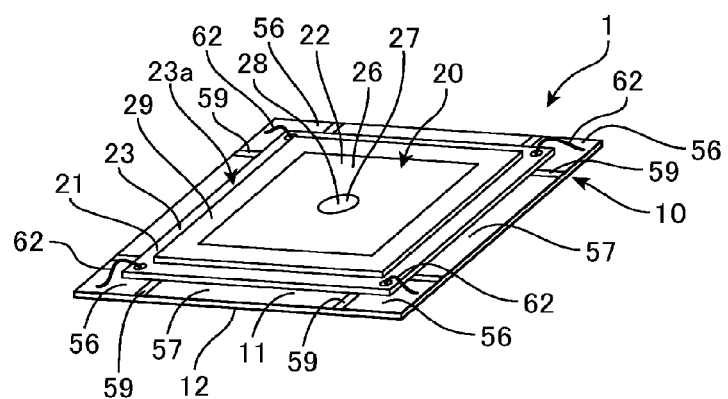
FIG. 3 is a perspective view showing a state where molding resin has been removed from the device.
Figure 4:
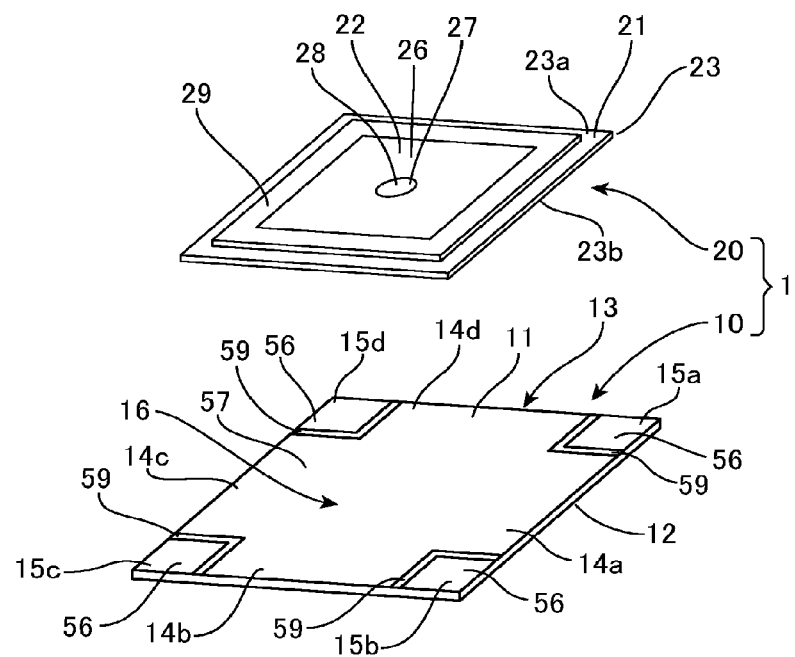
FIG. 4 is a view where the device has been separated into a substrate and a capacitor element.
Figure 5:
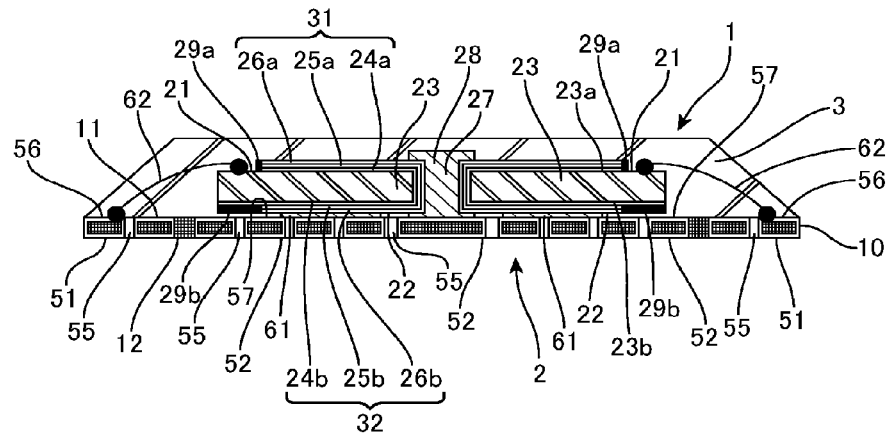
FIG. 5 is a V-V cross-sectional view of the device (a V-V cross section for FIG. 1).

FIG. 3 shows a state where the molding resin 3 of the device 1 has been removed. FIG. 4 shows a state where the substrate 10 and the capacitor element 20 have been separated. In FIG. 5, a V-V cross-sectional view of the device 1 (a V-V cross section for FIG. 1) is shown. The substrate 10 of the device 1 is a laminated board where a conductor (conductive layer, electrode layer) is formed on both surfaces of an insulated board (insulated substrate). The substrate 10 is a glass fabric/epoxy resin copper-clad laminated board (glass epoxy substrate) that has been cut into a substantially square form. The copper foil on the loading-side surface 11 and the mounting-side surface 12 of the substrate 10 is patterned by etching or the like to form the same electrode pattern on both surfaces 11 and 12. Accordingly, on the loading-side surface 11 of the substrate 10, a plurality of connecting electrodes 56 with the same form as the anode terminals 51 are formed at positions that are opposite (correspond to) the plurality of anode terminals 51 of the mounting-side surface 12 to produce anode connecting electrodes 56 for connecting to the anode (anode portion) 21 of the capacitor element 20. Also on the loading-side surface 11 of the substrate 10, a connecting electrode 57 with the same form as the second cathode terminal 52 is formed at a position that is opposite (corresponds to) the cathode terminal 52 of the mounting-side surface 12 to produce a cathode connecting electrode 57 for connecting to the cathode (cathode portion) 22 of the capacitor element 20.

That is, on the loading-side surface 11 of the substrate 10 also, the anode connecting electrodes 56 and the cathode connecting electrode 57 are disposed around the entire circumference 13, with the four anode connecting electrodes 56 being respectively formed at the four corners 15a to 15d of the loading-side surface 11. The cathode connecting electrode 57 is disposed in a part on the loading-side surface 11 of the substrate 10 that excludes the anode connecting electrodes 56. That is, the cathode connecting electrode 57 is formed so as to cover the center portion 16 and the four circumferential edges 14a to 14d of the loading-side surface 11 of the substrate 10. In the same way as the mounting-side surface 12, the anode connecting electrodes 56 and the cathode connecting electrode 57 are separated by insulating gaps 59.

The respective anode terminals 51 and the anode connecting electrodes 56 are electrically connected by through electrodes (through holes, via holes) 55 that pass through the substrate 10. The cathode terminal 52 and the cathode connecting electrode 57 are also electrically connected by through electrodes 55 that pass through the substrate 10. An appropriate number of the through electrodes 55 are provided at an appropriate pitch so as to suppress electrical resistance (connection resistance) between the first terminal electrodes 51 and the anode connecting electrodes 56 and between the cathode terminal 52 and the cathode connecting electrode 57.

1.3 Capacitor Element

Figure 6:
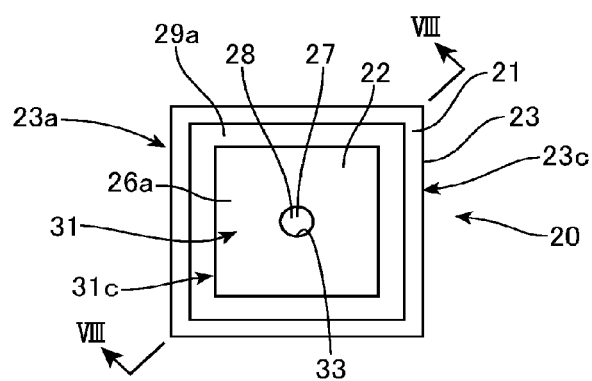
FIG. 6 is a view showing the capacitor element from above (when looking from the first surface side).
Figure 7:
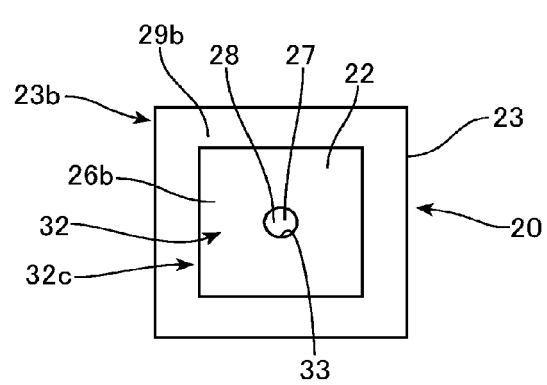
FIG. 7 is a view showing the capacitor element from below (when looking from the second surface side).
Figure 8:
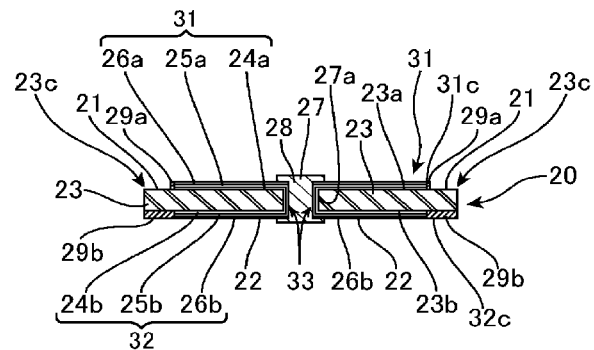
FIG. 8 is a VIII-VIII cross-sectional view showing the construction of the capacitor element (a VIII-VIII cross section for FIG. 6).
Figure 9:
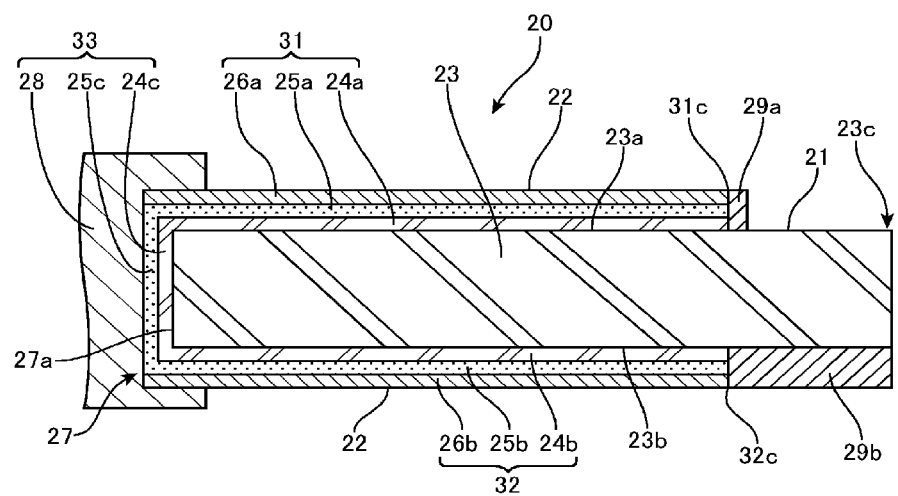
FIG. 9 is a cross-sectional view showing an enlargement of the construction of the capacitor element.

In FIG. 6, a plan view of the capacitor element 20 (when looking from the first surface (upper surface) side) is shown. In FIG. 7, a bottom view of the capacitor element 20 (when looking from the second surface (lower surface) side) is shown. In FIG. 8, a VIII-VIII cross-sectional view of the capacitor element 20 (a VIII-VIII cross section for FIG. 6) is shown. In addition, in FIG. 9, the structure of the capacitor element 20 is shown by way of a partially enlarged cross section.

The capacitor element (capacitor core) 20 of the device 1 is a solid electrolytic capacitor (solid electrolytic capacitor element) and includes a plate-like or thin film-like base (base substrate) 23 for having valve effect that has been cut in a substantially square shape. The base 23 has a first surface 23a and a second surface 23b that have been made porous by etching or the like. In this example, the second surface 23b is the lower-side surface (lower surface) that faces the loading-side surface 11 of the substrate 10 and the first surface 23a is the upper-side surface (upper surface) on the opposite side to the second surface 23b. These surfaces 23a and 23b may be inverted in the up-down direction or may face left and right.

A first functional layer 31 is formed on the first surface 23a of the base 23. The first functional layer 31 includes a dielectric oxide film 24a, a solid electrolyte layer 25a, and an electrode layer 26a laminated (layered) in that order on the first surface 23a. An etched aluminum foil, a tantalum sintered body, a niobium sintered body, and a titanium sintered body can be given as examples of the base 23 that has valve effect. When considering the formation of a slim device 1 for surface mounting, a capacitor element 20 that uses etched aluminum foil is suitable. If the base 23 is etched aluminum foil, the dielectric oxide film 24a is aluminum oxide formed on the surface thereof. The solid electrolyte layer 25a can be formed by laminating a conductive polymer such as polypyrrole, polythiophene, or polyaniline on the dielectric oxide film 24a by electropolymerization or the like. One example of the electrode layer 26a is conductive paste formed in a layer above the solid electrolyte layer 25a, and constructs the cathode portion 22. To reduce the contact resistance, the first functional layer 31 may include a highly-conductive graphite layer laminated between the solid electrolyte layer 25a and the electrode layer 26a.

A second functional layer 32 is formed on the second surface 23b of the base 23. The second functional layer 32 includes a dielectric oxide film 24b, a solid electrolyte layer 25b, and an electrode layer 26b laminated (layered) in that order on the second surface 23b. The electrode layer 26b forms the cathode portion 22 of the capacitor element 20. In the present specification, the electrode layers 26a and 26b that are described as functioning as the cathode portion 22 are cathodes in terms of appearance only and it is the solid electrolyte layers 25a and 25b that are given the role of functioning as actual cathodes. This is the same in the description given below.

A first insulating layer 29a that covers the entire circumference of a circumferential edge 31c of the first functional layer 31 is formed on the first surface 23a of the base 23. A second insulating layer 29b that covers the entire circumference of a circumferential edge 32c of the second functional layer 32 is formed on the second surface 23b of the base 23. A circumferential surface (circumferential edge) 23c of the first surface 23a of the base substrate 23 is exposed on an outer circumference side (i.e., outside, on the outer edge side, on the periphery side) of the first insulating layer 29a and forms a first electrode (anode) portion 21 of the capacitor element 20. One example of the insulating layers 29a and 29b are films composed of an insulating resin such as polyimide resin or epoxy resin.

The capacitor element 20 also includes a through-hole 27 that passes through the center of the base 23. A third functional layer 33 is formed on an inner circumferential surface 27a of the through-hole 27. The third functional layer 33 includes a dielectric oxide film 24c and a solid electrolyte layer 25c that are laminated in that order from the side that contacts the base 23. In addition, the through-hole 27 is filled with conductive paste such as silver paste to form a through electrode 28. Accordingly, the third functional layer 33 is constructed of the dielectric oxide film 24c, the solid electrolyte layer 25c, and the through electrode 28 that are laminated in that order from the base 23 side.

The dielectric oxide film 24c of the third functional layer 33 is integrally produced together with the dielectric oxide film 24a of the first functional layer 31 and the dielectric oxide film 24b of the second functional layer 32. The solid electrolyte layer 25c of the third functional layer 33 is integrally produced together with the solid electrolyte layer 25a of the first functional layer 31 and the solid electrolyte layer 25b of the second functional layer 32. At the inner circumferential surface 27a of the through-hole 27, by using a method such as electropolymerization, the solid electrolyte layer 25c can be formed together with the surface of the base 23. In addition, the through electrode 28 of the third functional layer 33 is provided so as to physically and electrically contact the electrode layer 26a of the first functional layer 31 and the electrode layer 26b of the second functional layer 32. Accordingly, in the capacitor element 20, a construction is used where due to the first to third functional layers 31 to 33, the inner circumferential surface 27a of the through-hole 27 functions together with the surfaces 23a and 23b as a solid electrolytic capacitor and the functional layers 31 to 33 are connected in parallel by the electrodes 23a, 23b, and 28 that form the cathode.

As shown in FIG. 5, the capacitor element 20 is loaded so that the second functional layer 32 on the second surface 23b of the base 23 faces the substrate 10 to form (manufacture) the device 1. As shown in FIG. 7, with the capacitor element 20, the electrode layer 26b (the cathode portion 22) is exposed in the central part of the second surface 23b and the circumference (the circumferential edge 32c of the second functional layer 32) of the second surface 23b of the base 23 is entirely covered by the insulating layer 29b. Accordingly, by orienting the second surface 23b toward the loading-side surface 11 of the substrate 10 and disposing the capacitor element 20 with a conductive paste 61 for element fixing in between, it is possible to electrically connect the cathode portion 22 of the capacitor element 20 and the cathode connecting electrode 57 of the substrate 10.

As shown in FIG. 6, at the circumference (the entire circumference, the circumferential edge 31c of the first functional layer 31) that includes the four edges and the four corners of the surface on the opposite side to the loading side (that is, the first surface 23a) of the base 23, the base 23 is exposed on the outer circumferential side of the first insulating layer 29a to form the anode portion 21. The anode portion 21 is formed, for example, by forming the insulating layer 29a on the first surface 23a in the same way as the second insulating layer 29b of the second surface 23b and then stripping or cutting off part of the first insulating layer 29a to expose the surface 23a of the base 23.

As shown in FIG. 5, in the device 1, the anode portion 21 that is exposed around the circumference of the first surface 23a of the capacitor element 20 and the anode connecting electrodes 56 of the substrate 10 are electrically connected by bonding using conductive metal wires 62 such as gold wires, copper wires, or aluminum wires. Since the anode portion 21 appears around the entire circumference of the first surface 23a of the capacitor element 20 that is rectangular when viewed from above, if the anode connecting electrodes 56 of the substrate 10 are provided at positions along the circumference of the loading-side surface 11 of the substrate 10 and are not limited to the corner parts, connection by wire bonding is possible. The capacitor element 20, including the bonding wires 62, is protected by the packaging resin (molding resin) 3. A sealing resin such as epoxy resin can be given as an example of the molding resin 3. Accordingly, a capacitor element 20 of this type can be flexibly adapted to a variety of electrode layouts for the substrate 10.

In the capacitor element 20, the first functional layer 31 is formed on the surface on the opposite side to the loading side, that is, on the first surface 23a of the base 23, and the electrode layer 26a on the surface thereof forms the cathode portion 22. The base 23 is exposed with the first insulating layer 29a in between on the outside of the entire circumference that includes the four edges and the four corners of the electrode layer 26a to form the first electrode (anode) portion 21. By this arrangement, the anode (first electrode) portion 21 and the cathode portion 22 (the electrode layer 26a) are disposed close to one another along the circumference. Accordingly, it is easy to provide a low ESL capacitor element 20 and the device 1 on which such a capacitor element 20 has been loaded. In addition, the positional relationship (opposing direction to the center) of the anode portion 21 and the electrode layer 26a changes along the circumferential edge 31c of the first functional layer 31, and the electrode layer 26a is connected via the through electrode 28 of the third functional layer 33 that passes through the center of the base 23 to the electrode layer 26b of the second functional layer 32 connected to the substrate 10. Accordingly, current flows through the first functional layer 31 in diverse directions, which also facilitates the provision of a low ESL capacitor element 20 and a device 1 with such capacitor element 20.

In the capacitor element 20, the cathode portions 22 (the electrode layers 26a and 26b) provided on both surfaces 23a and 23b of the base 23 are connected by the through electrode 28 provided so as to pass through the center of the base 23. In this arrangement, the anode (first electrode) portion 21 can be continuously disposed around the circumferential edge of the base 23. Also, the layout of the anode portion 21 with respect to the cathode portions 22 including the through electrode 28 is symmetrical to the center of the base. In addition, since the cathode portions 22 on both surfaces are connected by the through electrode 28 that passes through the center of the base 23, the distance between the electrodes for the capacitor element 20 as a whole is reduced. Those are the important factors to reduce the ESR of the capacitor element 20.

By forming the third functional layer 33 on the inner circumferential surface 27a of the through-hole 27, it is possible to add the inner circumferential surface 27a of the through-hole 27 to the area that functions as a solid electrolytic capacitor. This means that even if the through-hole 27 is disposed so as to pass through a central portion of the base 23 or the vicinity thereof, the drop in capacitance due to the through-hole 27 (i.e., the drop in the usage efficiency of the surface of the base 23) can be reduced and the through-hole 27 can be flexibly disposed at a desired location on the base 23.

The anode portion 21 is formed around the entire circumference of the capacitor element 20 so as to surround the electrode layer 26a. By this arrangement, electrical connections are possible from a variety of positions and it is possible to improve flexibility with respect to the wiring pattern of the substrate 10 on which the capacitor element 20 is loaded.

1.4 Usage Examples

Figure 10:
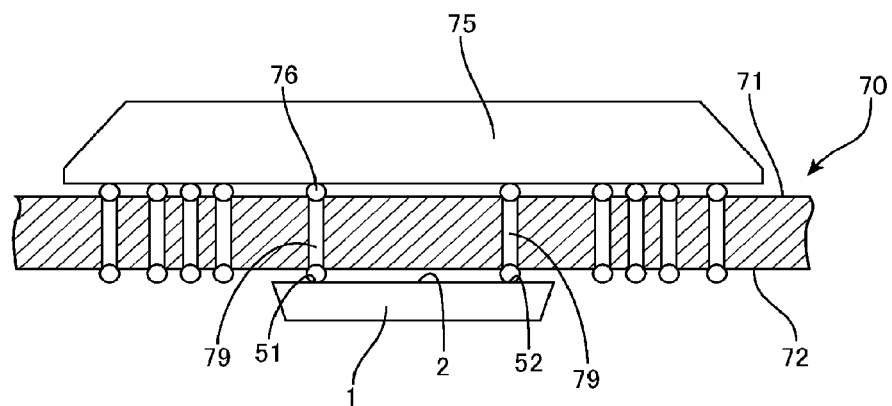
FIG. 10 is a cross-sectional view showing part of a printed circuit board that has a device mounted thereupon.

FIG. 10 shows part of a printed circuit board 70 on which the device 1 has been loaded in cross-section. A CPU 75 is mounted on an upper surface 71 of the printed circuit board (PCB) 70. The capacitor device 1 according to the present embodiment is mounted on a position on a lower surface 72 of the printed circuit board 70 which is opposite a power supply terminal 76 in a central part of the CPU 75. The power supply terminal 76 of the CPU 75 and the terminal electrodes 51 and 52 on the mounting surface 2 of the device 1 are electrically connected by a plurality of through electrodes 79 that pass through the printed circuit board 70, and the device 1 functions as a decoupling capacitor or a bypass capacitor.

As one example, the device 1 is a slim and compact capacitor chip for surface mounting where the length of one side is around 10 mm and the thickness is around 2 to 4 mm. This device 1 is a slim and compact large-capacity capacitor device that incorporates the solid electrolytic capacitor element 20 and has a low ESR and low ESL. The space required to mount the device 1 is small. Also, the device 1 is a multiple-electrode device where a plurality of anode electrodes 51 are provided on the mounting surface 2. An application where a plurality of capacitors were conventionally loaded can be covered by one or a low number of the devices 1. Accordingly, this is favorable for electronic appliances such as information processing terminals like notebook-type personal computers that are becoming increasingly compact and portable information processing terminals like mobile phones and PDAs.

In addition, as shown in FIG. 2, in the device 1, all of the anode terminals 51 and the cathode terminal 52 are disposed adjacently. The current path can be shortened and the loop area can be reduced, which makes it possible to suppress ESL. Also, the anode terminals 51 and the cathode terminals 52 are disposed in the four directions of the device 1 around the circumference of the device 1. In this arrangement, the direction of inside current flows of the device 1 is diversified, which makes it easy for the magnetic fields produced by current to cancel each other out. Accordingly, it is possible to further suppress ESL and provide the device 1 that is further suited to noise reduction in a high frequency region.

The anode terminals 51 and the cathode terminal 52 and the anode portion 21 and the cathode portion 22 of the capacitor element 20 are connected at short distances, and the capacitor element 20 is constructed with the through-hole 27 disposed in the center and a reduced distance between the anode portion 21 and the cathode portion 22. Accordingly, ESR can be suppressed further. That makes possible to provide the device 1 that is capable of coping with rapid charging and discharging and is even more suited to use in backing up capacitors of a CPU of a personal computer or the like. In this way, by using the device 1, it is possible to provide a capacitor device that is more compact, has low ESR, low ESL and a large capacity, making the capacitor device even more favorable for a portable electronic appliance.

As shown in FIG. 2, on the mounting surface 2 of the device 1, the anode terminals 51 and the parts of the cathode terminal 52 appear alternately around the entire circumference 13 in an externally connectable state. This arrangement is easy to flexibly cope with a variety of layouts of power supply terminals 76 of the CPU 75 and wiring patterns of the printed circuit board 70. The terminal electrodes 51 or 52 are disposed around the entire circumference 13 of the mounting surface 2 of the device 1, and in particular it is possible to increase the area and/or length in which the cathode terminal 52 is disposed around the entire circumference 13. For this reason, it is possible to use the cathode terminal 52 as a shield electrode and suppress noise leaks. Since the anode terminals 51 are next to (adjacent to) the cathode terminal 52 in at least two directions (two edges), this arrangement is favorable to shield the anode terminals 51 using the cathode terminal 52. In addition, the cathode terminal 52 is formed so as to widely cover the center part 16 of the substrate 10. It is easy to shield the capacitor element 20 using the cathode terminal 52. In this way, the device 1 is a device that is easy to mount on the printed circuit board 70 and is also suited to noise reduction.

2. Various Examples of Devices

Examples of different devices according to the present invention are given below, but the present invention is not limited to such examples.

2.1 Layout of Mounting Surface

The devices shown below are examples where the layout of the mounting surface 2 of the device, that is, the mounting-side surface 12 of the substrate 10 is changed, and since the capacitor element 20 loaded on the substrate 10 is the same, description thereof is omitted.

Figure 11:
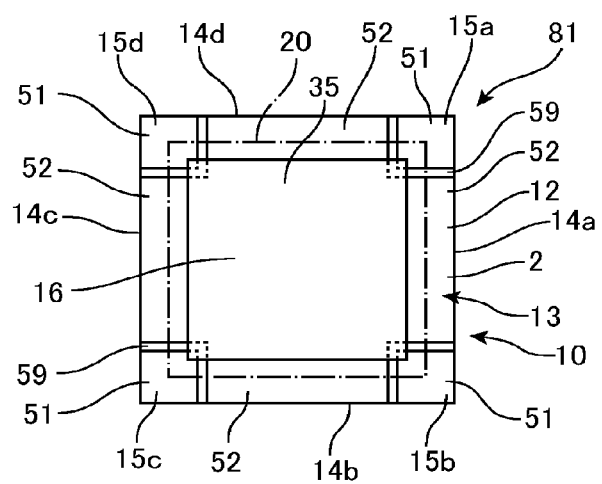
FIG. 11 is a view showing the mounting surface of a different example of a device.

FIG. 11 shows the mounting surface 2, that is, the mounting-side surface 12 of the substrate 10 of a different device 81. In this device 81, the center part 16 of the mounting surface 2 is covered by an insulating sheet (a masking member) 35 of polyimide resin or epoxy resin, and the anode terminals 51 and the cathode terminals 52 appear only at parts along the entire circumference 13 of the mounting surface 2. That is, the anode terminals 51 respectively appear at the four corners 15a to 15d of the mounting surface 2 and the cathode terminals 52 respectively appear at the four edges (four sides) 14a to 14d of the mounting surface 2. Accordingly, the anode terminals 51 and the cathode terminal 52 appear alternately so as to construct a frame or edge of the mounting surface 2 around the entire circumference 13 of the mounting surface 2.

By reducing the area where the anode terminals 51 and the cathode terminals 52 appear on the mounting surface 2, it is possible to reduce the amount of solder or the like required to connect to the wiring of the printed circuit board 70 and to produce a device more suited to mounting. Note that in the various embodiments shown below, in the same way as the example shown in FIG. 11, it is possible to cover a central part of the mounting surface 2 with an insulating sheet or insulating film and obtain the same effects.

Figure 12:
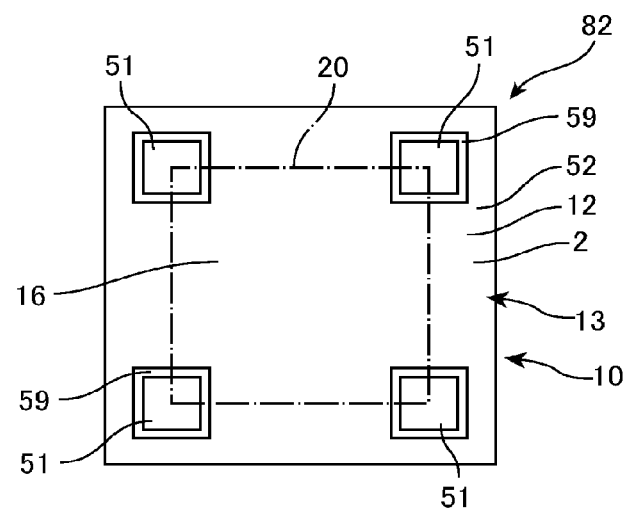
FIG. 12 is a view showing the mounting surface of a different example of a device.

FIG. 12 shows the mounting surface 2, that is, the mounting-side surface 12 of the substrate 10 of yet another device 82. In the device 82, the cathode terminal 52 is continuously formed around the entire circumference 13 of the mounting-side surface 12 of the substrate 10 so as to surround the mounting-side surface 12. In addition, the four anode terminals 51 are respectively provided inside the continuous part of the cathode terminal 52 so as to be surrounded by the cathode terminal 52. Accordingly, on the mounting surface 2 of the device 82, the cathode terminal 52 appears continuously around the entire circumference 13 (four corners and four edges) of the mounting surface 2 so as to surround the mounting surface 2. In addition, the four anode terminals 51 respectively appear on the inside of the continuous part of the cathode terminal 52 so as to be surrounded by the cathode terminal 52 and can be externally connected. With such device 82, since the respective anode terminals 51 are surrounded by the cathode terminal 52, it is possible to further suppress noise leaks.

Figure 13:
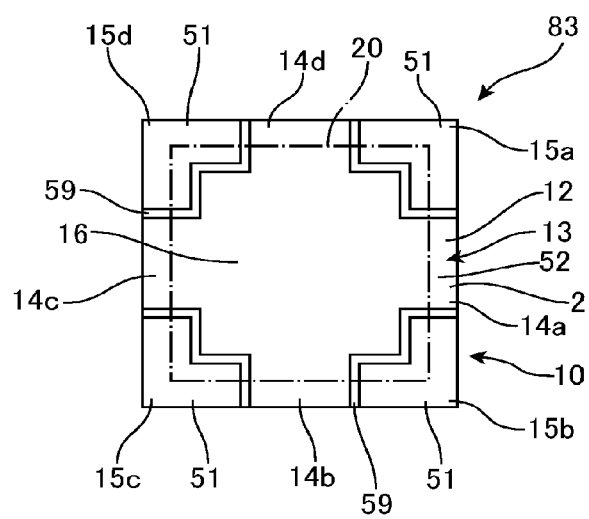
FIG. 13 is a view showing the mounting surface of a different example of a device.

FIG. 13 shows the mounting surface 2, that is, the mounting-side surface 12 of the substrate 10 of yet another device 83. In the device 83, the anode terminals 51 are formed in the respective corners 15a to 15d of the mounting-side surface 12 of the substrate 10 and the anode terminals 51 are also formed in L shapes around the respective corners 15a to 15d. Accordingly, on the mounting surface 2 of the device 83, the L-shaped anode terminals 51 for using external connections respectively appear in the corners 15a to 15d. Not limited in this example, the form or shape of the terminals formed on the mounting-side surface 12 on substrates 10 and the form or shape of the terminals appearing on the mounting surface 2 of devices included in this invention are not limited to rectangles and may be L shaped or others.

Figure 14:
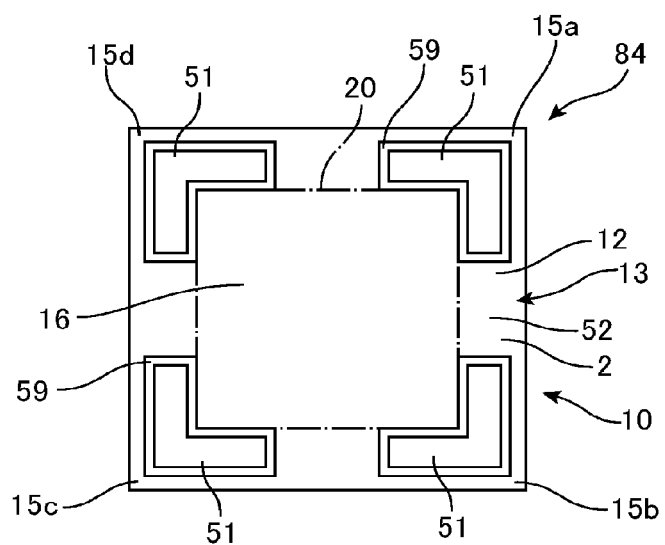
FIG. 14 is a view showing the mounting surface of a different example of a device.

FIG. 14 shows the mounting surface 2, that is, the mounting-side surface 12 of the substrate 10 of yet another device 84. In this device 84, the cathode terminal 52 is continuously formed around the entire circumference 13 of the mounting-side surface 12 of the substrate 10 so as to surround the mounting-side surface 12 and L-shaped anode terminals 51 are formed in the respective corners 15a to 15d on the inside thereof. Accordingly, on the mounting surface 2 of the device 84, the cathode terminal 52 continuously appears around the entire circumference 13 of the mounting surface 2 so as to surround the mounting surface 2. Also, the four L-shaped anode terminals 51 appear on the inside of the cathode terminal 52 so as to be surrounded by the cathode terminal 52 and are capable of being externally connected. The anode terminals 51 disposed on the inside of the cathode terminal 52 are not limited to rectangles and may be L shaped as in this example and may also be circular or the like.

Figure 15:
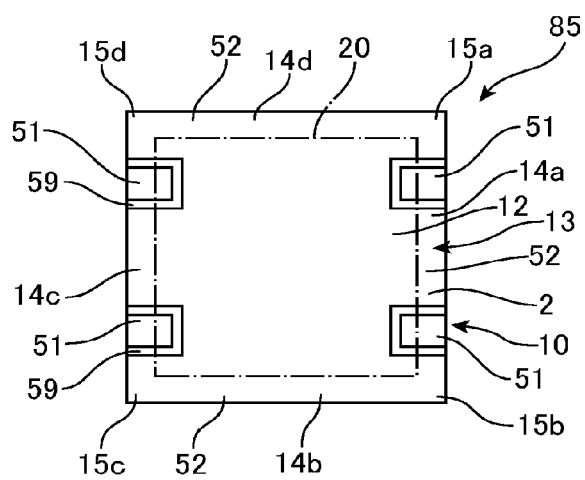
FIG. 15 is a view showing the mounting surface of a different example of a device.

FIG. 15 shows the mounting surface 2, that is, the mounting-side surface 12 of the substrate 10 of yet another device 85. In this device 85, the cathode terminal 52 is continuously formed on two opposite sides (edges) 14b and 14d of the mounting-side surface 12 of the substrate 10. In addition, the cathode terminal 52 is formed in a part that includes the four corners 15a to 15d. The four anode terminals 51 are formed so as to sandwich parts of the cathode terminal 52 on the sides (edges) 14a and 14c that are sandwiched by the cathode terminal 52 that extends along the two edges 14b and 14d. Accordingly, on the mounting surface 2 of the device 85, the cathode terminal 52 appears along the two edges 14b and 14d so as to include the four corners 15a to 15d. Also, the four anode terminals 51 appear so as to sandwich parts of the cathode terminal 52 on the two edges 14a and 14c of the mounting surface 2. In a device 85 of this type, it is possible to sandwich the power supply wires connected to the anode terminals 51 with the cathode terminal 52 disposed along the edges 14b and 14d. This means that it is possible to provide a device 85 where it is easy to suppress noise leaks.

Figure 16:
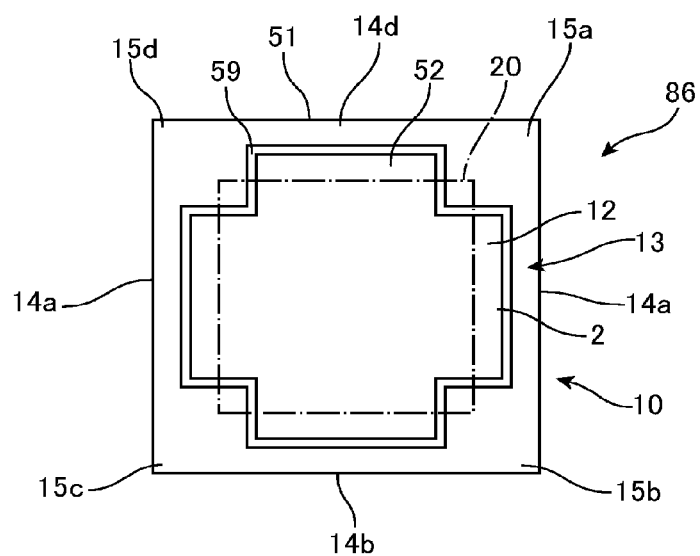
FIG. 16 is a view showing the mounting surface of a different example of a device.

FIG. 16 shows the mounting surface 2, that is, the mounting-side surface 12 of the substrate 10 of yet another device 86. In this device 86, the anode terminal 51 is continuously disposed along the entire circumference 13 of the mounting-side surface 12 of the substrate 10. In addition, the cathode terminal 52 is disposed on the inside of the anode terminal 51 and adjacent to the anode terminal 51 along the four sides (edges) 14a to 14d. Accordingly, on the mounting surface 2 of the device 86, the anode terminal 51 appears along the entire circumference 13 and the cathode terminal 52 appears so as to be adjacent to the anode terminal 51 on the inside thereof along the edges 14a to 14d. In this arrangement, one continuous anode terminal 51 and one continuous cathode terminal 52 are used to adjacently dispose the anode terminal 51 and the cathode terminal 52 across the mounting surface 2 of the device 86 and around the entire circumference 13 of the mounting-side surface 12 of the substrate 10.

Figure 17:
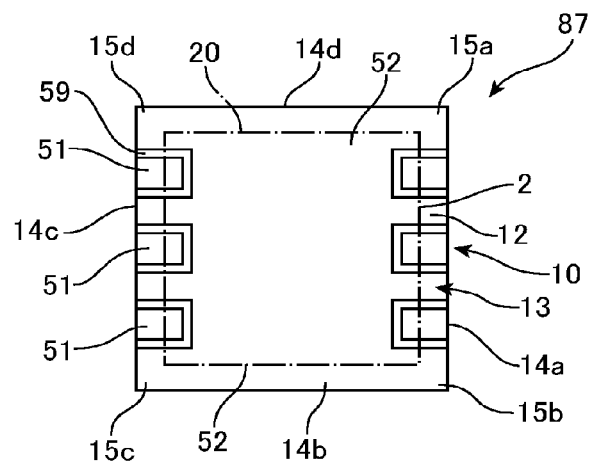
FIG. 17 is a view showing the mounting surface of a different example of a device.

FIG. 17 shows the mounting surface 2, that is, the mounting-side surface 12 of the substrate 10 of yet another device 87. In this device 87, the cathode terminals 52 are formed on two opposite edges 14b and 14d of the mounting-side surface 12 of the substrate 10. In addition, the cathode terminal 52 is formed in a part that includes the four corners 15a to 15d. The six anode terminals 51 are formed so as to sandwich the cathode terminal 52 on the edges 14a and 14c that are sandwiched by the cathode terminal 52 that extends along the two edges 14b and 14d. Accordingly, on the mounting surface 2 of the device 87, the cathode terminal 52 appears along the two edges 14b and 14d so as to include the four corners 15a to 15d. Also, the six anode terminals 51 appear so as to sandwich the cathode terminal 52 on the edges 14a and 14c of the mounting surface 2. With the device 87 of this type, it is possible to sandwich the power supply wires connected to the large number of anode terminals 51 with the cathode terminal 52 disposed along the edges 14b and 14d. This means it is possible to provide a device 87 where it is easy to suppress noise leaks. In this way, with the device 87, it is possible to easily lay out even a combination of terminals including five or more anode terminals 51 across the mounting surface 2 and the entire circumference 13 of the mounting-side surface 12 of the substrate 10.

Figure 18:
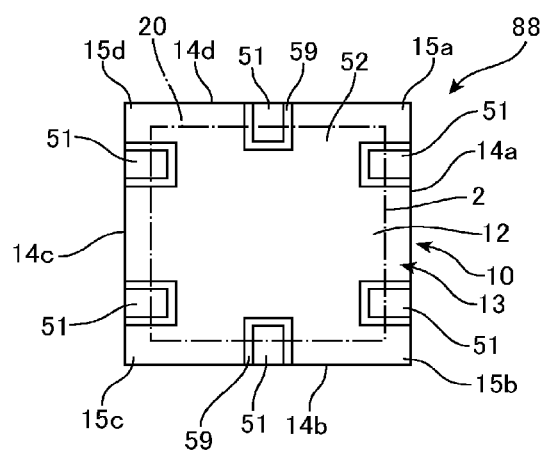
FIG. 18 is a view showing the mounting surface of a different example of a device.

FIG. 18 shows the mounting surface 2, that is, the mounting-side surface 12 of the substrate 10 of yet another device 88. With this device 88, one or a plurality of anode terminals 51 are disposed on each of the edges (sides) 14a to 14d and the cathode terminal 52 is disposed in the remaining part of the entire circumference 13. Accordingly, on the mounting surface 2 of the device 88, one or a plurality of anode terminals 51 appears on each of the edges (each side) 14a to 14d and the cathode terminal 52 appears in the remaining part of the entire circumference 13 including each side. With the device 88, the cathode terminal 52 appears along the two edges 14b and 14d so as to include the four corners 15a to 15d, two anode terminals 51 appear on the edges 14b and 14d of the mounting surface 2 so as to be sandwiched by the cathode terminal 52, and four anode terminals 51 appear on the edges 14a and 14c of the mounting surface 2 so as to sandwich the cathode terminal 52. With the device 88 of this type, it is possible to sandwich the power supply wires connected to the large number of anode terminals 51 with the cathode terminal 52 that is disposed along the edges 14a to 14d, which makes it easy to suppress noise leaks. With the device 88, it is possible to easily lay out even a combination of terminals including five or more anode terminals 51 across the mounting surface 2 and the entire circumference 13 of the mounting-side surface 12 of the substrate 10.

2.2 Numerous Examples of Capacitor Elements

FIGS. 19 to 22 show examples of different devices according to the present invention by extracting the capacitor elements from such devices. Capacitor element 20 with variety designs including the designs described hereafter can be appropriately loaded on a variety of designs for the substrate 10, including the designs described earlier.

Figure 19:
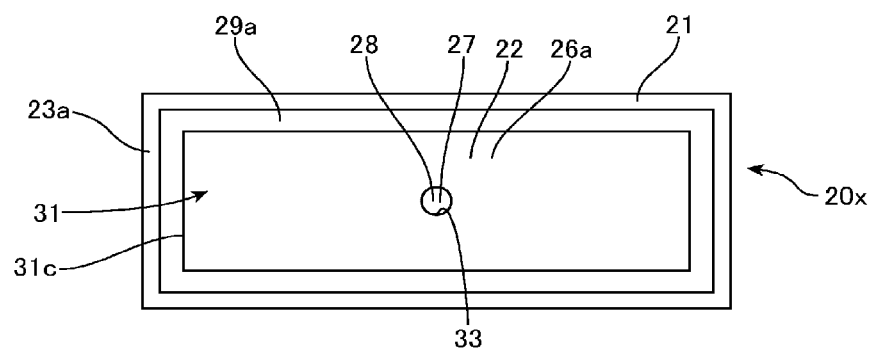
FIG. 19 is a view showing a different example of a capacitor element from above (when looking from the first surface side).

FIG. 19 shows a different example of a capacitor element. For the capacitor element 20x shown in FIG. 19 the external form of the base 23 is rectangular, the through-hole 27 is provided at a point of intersection of the diagonals, and the first functional layer 31 and the second functional layer 32 are connected by the third functional layer 33. Forms of the capacitor element 20 are not limited to a square and may be rectangular or another polygon when viewed from above. A capacitor element 20 may be circular. Most devices for surface mounting are quadrangular when viewed from above and in view of space efficiency for providing a capacitor device with large capacity, it is preferable for the capacitor element to also be quadrangular, such as substantially square or substantially rectangular, when viewed from above.

Figure 20:
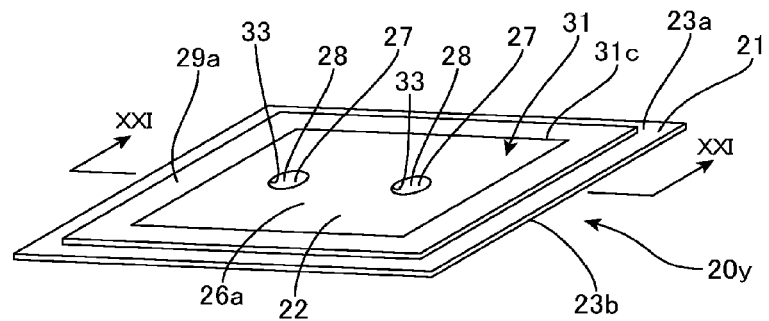
FIG. 20 is a perspective view of a different example of a capacitor element.
Figure 21:
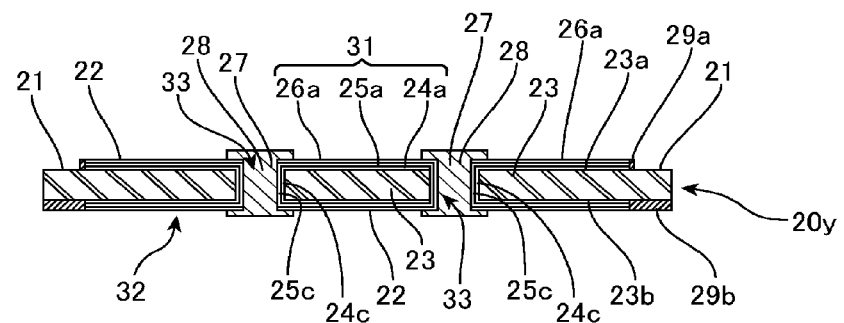
FIG. 21 is a XXI-XXI cross-sectional view of the capacitor element shown in FIG. 20 (a XXI-XXI cross section for FIG. 20).

FIG. 20 shows yet another example of a capacitor element. FIG. 21 shows the construction of the capacitor element 20y by way of a XXI-XXI cross-sectional view (an XXI-XXI cross section for FIG. 20). In the same way as the capacitor element 20x shown in FIG. 19, the capacitor element 20y includes a base 23 in the form of a plate or a thin film cut into a substantially rectangular shape, and two through-holes 27 are provided at symmetrical positions on both sides of the center at two locations along the longer dimension along a center line in the shorter dimension. The third functional layer 33 is provided on the inner circumferential surfaces 27a of the respective through-holes 27 so that the first functional layer 31 and the second functional layer 32 are connected by the plurality of third functional layers 33.

To provide a low ESL and low ESR capacitor element and a device on which such a capacitor element has been loaded, it is preferable to make the distance between the anode and cathode (ground) of the capacitor as short as possible. In particular, it is preferable to reduce the distance between the terminals connected to the substrate 10. In this example, it is preferable to reduce the electrical distance between the anode portion 21 and the cathode portion 22 on the rear surface (second surface) 23b side loaded on the substrate 10, that is, the electrode layer 26b of the second functional layer 32 and make the electrical resistance therebetween small. Here, it is effective to provide a large number of holes 27 that pass through the base 23 in the capacitor element 20 and to reduce the cross-sectional area of the through-holes 27. This is because the loss in the area of the first and second surfaces 23a and 23b due to the provision of the through-holes 27 is proportionate to the square of the radius, and the increase in area of the third functional layer 33 provided on the inner circumferential surfaces of the through-holes 27 is proportionate to the radius.

In addition, since the current paths become shorter and the current paths are further diversified by providing the through-holes 27 at two or more positions, it is possible to provide a low ESR and low ESL capacitor element that has even larger capacity and a low ESR and low ESL device with a capacitor element.

Figure 22:
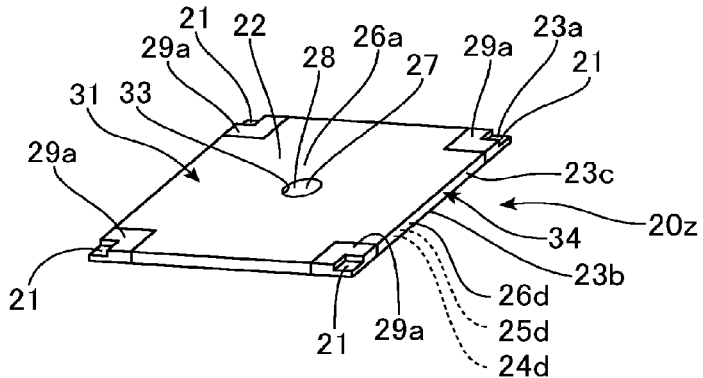
FIG. 22 is a perspective view of a different example of a capacitor element.

In FIG. 22, yet another example of a capacitor element is shown by way of a perspective view. This capacitor element 20z includes fourth functional layers 34 respectively provided on circumferential surfaces (side surfaces) of the base 23 in addition to the first functional layer 31 provided on the first surface 23a of the base 23, the second functional layer 32 provided on the second surface 23b, and the third functional layer 33 provided on the through-hole 27. Respective fourth functional layers 34 include a dielectric oxide film 24d, a solid electrolyte layer 25d, and an electrode layer 26d laminated in that order on the circumferential surface 23c.

In the capacitor element 20z, the first functional layer 31 and the second functional layer 32 are connected by the fourth functional layers 34 in addition to the third functional layer 33. The electrode layer 26a of the first surface 23a and the electrode layer 26b of the second surface 23b of the base 23 are connected by a through electrode 28 provided on the inner circumferential surface of the through-hole 27 formed in the center (middle) of the base 23 or the vicinity thereof so as to pass through the base 23. In addition, the electrode layer 26a of the first surface 23a and the electrode layer 26b of the second surface 23b of the base 23 are electrically connected by the electrode layers 26d provided on the circumferential surfaces 23c. By using the fourth functional layers 34 provided on the circumferential surfaces 23c, it is also possible to further achieve a higher capacity as a solid electrolytic capacitor. When the electrode layers 26d are provided on the circumferential surfaces 23c of the base 23, the through electrode 28 may be omitted.

The four corners of the first functional layer 31 of the first surface 23a of the base 23 are cut away and the circumferential edge of the first functional layer 31 formed by such cutting away is covered by the first insulating layer 29a. In addition, the anode portions 21 are formed so as to appear at the four corners of the base 23 and be separated from the first functional layer 31 and the fourth functional layer 34 by the first insulating layer 29a. In the capacitor element 20, the anode portions 21 appear intermittently in the four directions (at four locations). It is possible to flexibly connect to a wiring pattern of the substrate 10 on which the capacitor element 20 is loaded.

Figure 23:
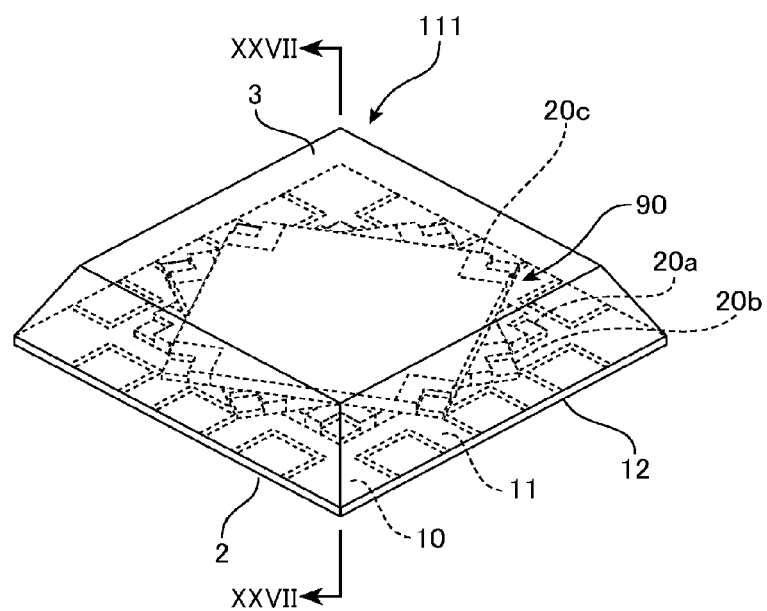
FIG. 23 is a perspective view showing an overview of a different example of a device.

2.3 Overview of Device Including a Capacitor Unit that Includes a Plurality of Stacked Capacitor Elements In FIG. 23, another example of a device 111 according to the present invention is shown. The device 111 includes the substrate 10 and a capacitor unit (stacked element body) 90 loaded (packaged, molded) on the loading-side (packaging-side) surface 11 of the substrate 10, and is a device for surface mounting that is integrally molded into a square or a rectangle including the substrate 10 and the capacitor unit 90 using a packaging resin (molding resin) 3.

Figure 24:
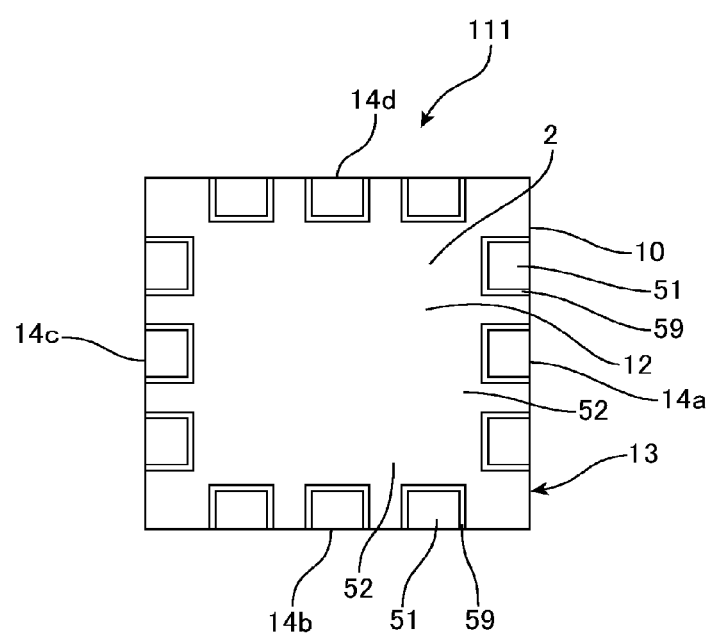
FIG. 24 is a view showing a mounting surface of the device shown in FIG. 23.

In FIG. 24, the mounting surface 2 of the device 111 is shown. In this device 111, the mounting-side surface 12 of the substrate 10 is not covered with the packaging resin 3 and is exposed as the mounting surface 2. On the mounting surface 2 of the device 111, that is, the mounting-side surface 12 of the substrate 10, the first terminal electrodes 51 and the second terminal electrodes 52 are disposed so as to be adjacent to one another around the entire circumference 13. The first terminal electrodes 51 of the device 111 are anode terminals connected to the anodes of the capacitor unit 90. The device 111 includes twelve anode terminals 51, which are formed on the four sides (four edges) 14a to 14d of the mounting-side surface 12 of the substrate 10. The second terminal electrode 52 of the device 111 is a cathode terminal connected to the cathodes of the capacitor unit 90 and is disposed in a part of the mounting-side surface 12 of the substrate 10 that excludes the anode terminals 51. The anode terminals 51 and the cathode terminal (terminal electrode) 52 are separated by the insulating gaps 59.

Figure 25:
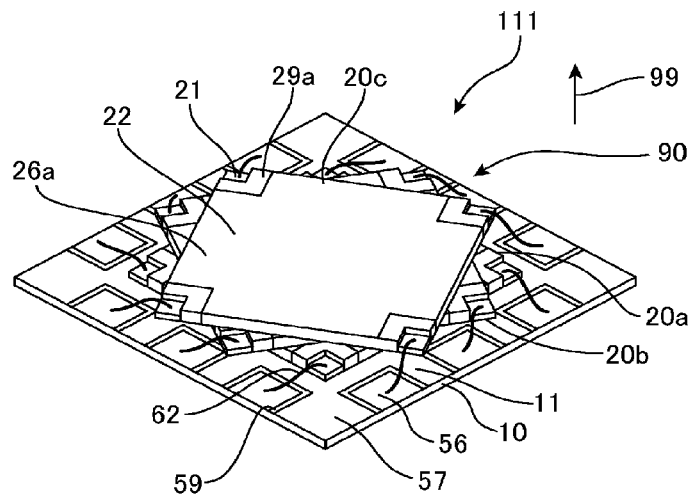
FIG. 25 is a perspective view showing the device shown in FIG. 23 in a state where the molding resin has been removed.
Figure 26:
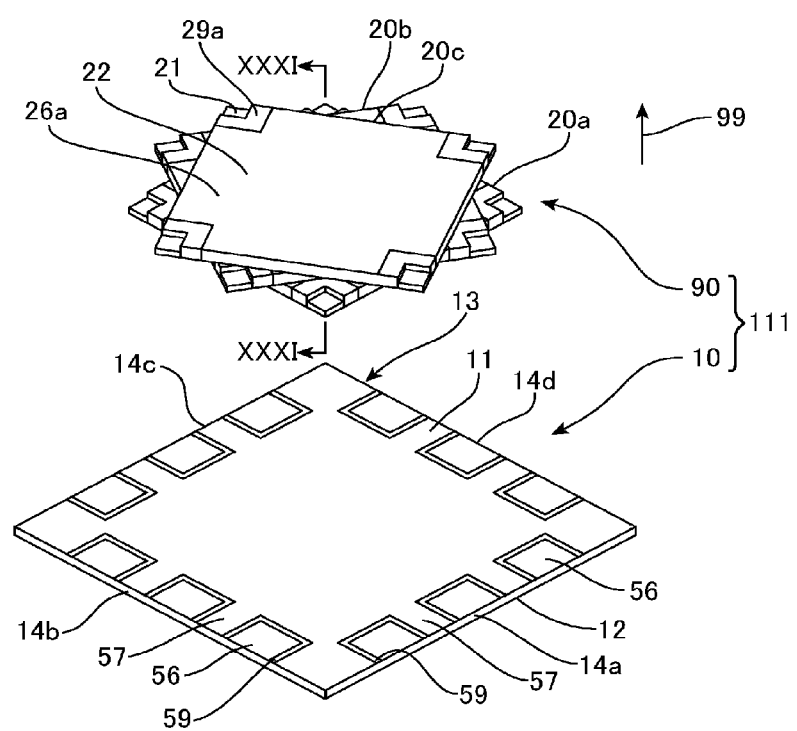
FIG. 26 is a view where the device shown in FIG. 23 has been separated into a substrate and a capacitor unit.
Figure 27:
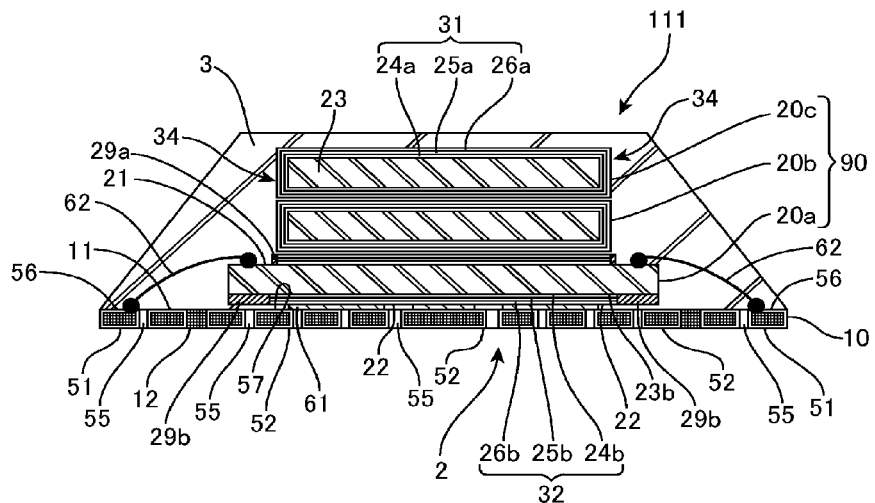
FIG. 27 is a XXVII-XXVII cross-sectional view of the device shown in FIG. 23 (a XXVII-XXVII cross section for FIG. 23).

In FIG. 25, a state where the molding resin 3 of the device 111 is omitted is shown. In FIG. 26, a state where the substrate 10 and the capacitor unit 90 are separated is shown. In FIG. 27, a XXVII-XXVII cross-sectional view of the device 1 (a XXVII-XXVII cross section for FIG. 23) is shown.

The capacitor unit 90 of the device 111 is a laminated type where three capacitor elements 20a, 20b, and 20c are layered (laminated or stacked) from the substrate 10 side on the loading-side surface 11 of the substrate 10 upwards, that is, in a perpendicular direction (first direction) 99 on the loading-side surface 11 of the substrate 10, with the single capacitor unit 90 being formed from such three capacitor elements 20a, 20b, and 20c. The three capacitor elements 20a, 20b, and 20c all have the same construction. In the following description, the construction of the individual capacitor elements will be described with reference to the uppermost capacitor element 20c or the lowermost capacitor element 20a.

Figure 28:
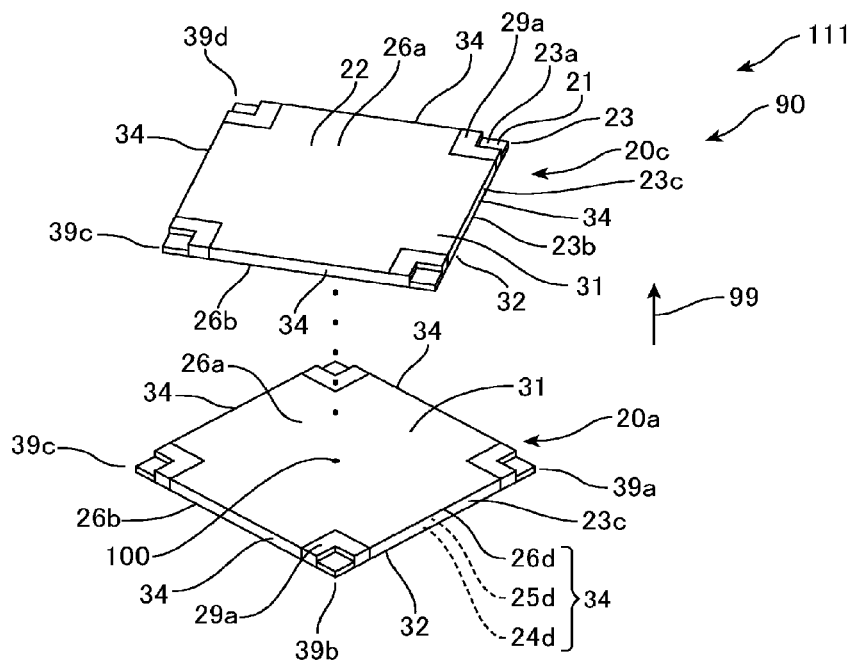
FIG. 28 is a view showing a state where a plurality of capacitor units are to be laminated.
Figure 29:
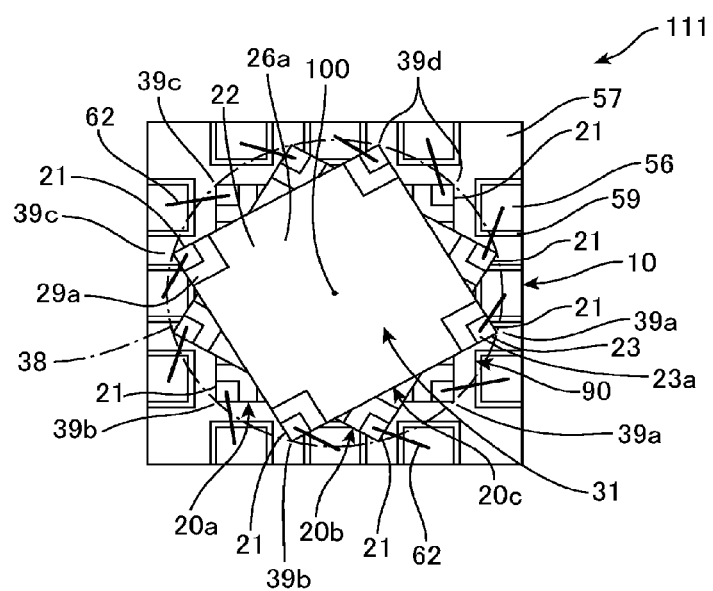
FIG. 29 is a plan view of the capacitor unit shown in FIG. 26.
Figure 30:
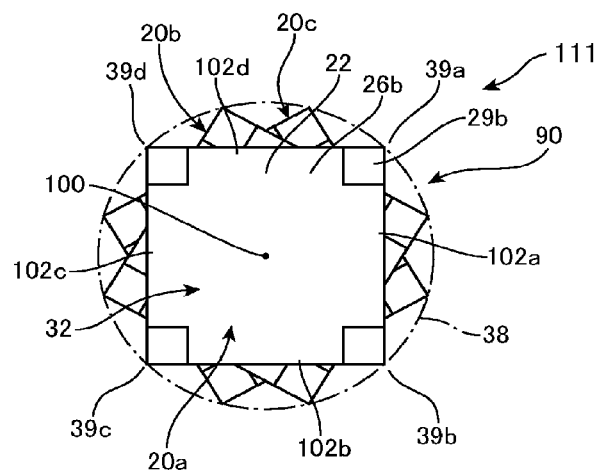
FIG. 30 is a bottom view of the capacitor unit shown in FIG. 26.

FIG. 28 shows how the capacitor unit 90 is formed by laminating (stacking) a plurality of capacitor elements. In FIG. 29, a plan view when looking from the upward direction (first direction) 99 of the capacitor unit 90 is shown, and the electrode layer 26a of the capacitor element 20c stacked at the top is visible. In FIG. 30, a bottom view of the capacitor unit 90 when looking from below which is opposite to the upward direction 99 is shown, and the electrode layer 26b of the capacitor element 20a stacked at the bottom is visible. In addition, in FIG. 31, a XXXI-XXXI cross-sectional view of the capacitor unit 90 (a XXXI-XXXI cross section for FIG. 26) is shown.

The capacitor elements (capacitor cores) 20a to 20c are solid electrolytic capacitors (solid electrolytic capacitor elements). The respective capacitor elements 20a to 20c include a plate-like or thin film-like base 23 for having valve effect that has been cut in a substantially square shape. The base 23 has a first surface 23a and a second surface 23b that have been made porous by etching or the like. In this example, the second surface 23b is the lower-side surface (lower surface) that faces the loading-side surface 11 of the substrate 10 and the first surface 23a is the upper-side surface (upper surface) on the opposite side to the second surface 23b.

Figure 31:
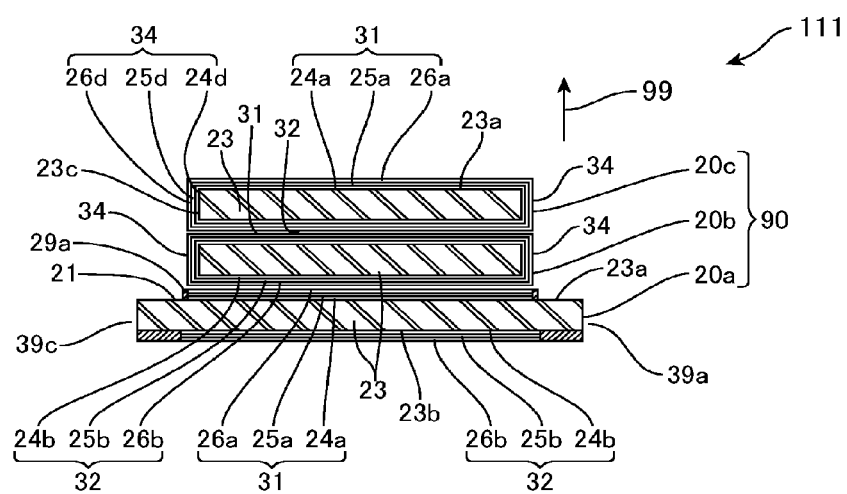
FIG. 31 is a XXXI-XXXI cross-sectional view of the capacitor unit shown in FIG. 26 (a XXXI-XXXI cross section for FIG. 26).

As shown in FIG. 31, the first functional layer 31 is formed on the first surface 23a of the base (base substrate for valve effect) 23. The first functional layer 31 includes a dielectric oxide film 24a, a solid electrolyte layer 25a, and an electrode layer 26a laminated in that order on the first surface 23a. The second functional layer 32 is formed on the second surface 23b of the base 23. The second functional layer 32 includes a dielectric oxide film 24b, a solid electrolyte layer 25b, and an electrode layer 26b laminated in that order on the second surface 23b. The electrode layer 26b forms the cathode portion 22 of the capacitor elements 20a to 20c.

The fourth functional layer 34 is formed on the circumferential surface (side surface) 23c of the base 23. The fourth functional layer 34 includes a dielectric oxide film 24d, a solid electrolyte layer 25d, and an electrode layer 26d laminated in that order on the circumferential surface 23c. The fourth functional layers 34 are provided on the circumferential surfaces 23c of the base 23 except for the four corners 39a, 39b, 39c, and 39d of the base 23. In the respective capacitor elements 20a to 20c, the first functional layer 31 and the second functional layer 32 are connected by the fourth functional layer 34. That is, the electrode layer 26a of the first surface 23a and the electrode layer 26b of the second surface 23b of the base 23 are electrically connected by the electrode layer 26d provided on the circumferential surface 23c. By using the fourth functional layers 34 provided on the circumferential surface 23c, it is also possible to further achieve a higher capacity as a solid electrolytic capacitor for the respective elements 20a to 20c.

The four corners of the first functional layer 31 of the first surface 23a of the base 23 are cut away respectively. The cutaway circumferential edge of the first functional layer 31 is covered by the first insulating layer 29a. In addition, the first electrode (anode) portions 21 are formed so as to appear at the four corners 39a to 39d of the base 23 and be separated from the first functional layer 31 and the fourth functional layers 34 by the first insulating layer 29a. For example, it is possible to form the anode portion 21 by forming the insulating layer 29a on the first surface 23a in the same way as the second insulating layer 29b of the second surface 23b and stripping or cutting off part of the insulating layer 29a to expose the surface 23a of the base 23.

As shown in FIG. 29, the capacitor unit 90 has the capacitor elements 20a to 20c laminated (stacked) while being rotated around the center (center of plate) 100 thereof. The capacitor elements 20a to 20c are respectively so called four-terminal capacitor elements where the anode portions 21 intermittently appear at the corners 39a to 39d in the four directions (at four positions). In the capacitor unit 90, for such elements 20a to 20c, the four corners 39a to 39d of the first surface 23a of the respective elements 20a to 20c are exposed in the upward direction (the first direction) 99 relative to the other elements, for example, the four corners 39a to 39d of the element 20a are exposed relative to the other elements 20b to 20c. This is also the same for the elements 20b and 20c. By stacking the elements 20a to 20c so as to be shifted by 30 degrees, for example, with respect to each other, it is possible to manufacture the capacitor unit 90 so that the four corners 39a to 39d of all of the elements 20a to 20c are exposed in the upward direction 99.

Accordingly, the anode portions 21 provided in the four corners 39a to 39d of the respective elements 20a to 20c can all be easily accessed from the upward direction 99. With the example shown in FIG. 29, the anode portions 21 provided in the four corners 39a to 39d of the respective elements 20a to 20c are respectively connected to the twelve anode connecting electrodes 56 of the loading-side surface 11 of the substrate 10 by the bonding wires 62.

The four corners 39a to 39d of the respective elements 20a to 20c are the same distance from the center 100 of the respective elements 20a to 20c. Accordingly, in the capacitor unit 90, the four corners 39a to 39d of the elements 20a to 20c are equal distances from the center 100. This means that the anode portions 21 provided in the four corners 39a to 39d are disposed substantially along the circumference of a virtual circle (first circle) 38 shown by a dot-dash line in FIG. 29 and FIG. 30. The respective parts of the capacitor unit 90 fundamentally exhibit rotational symmetry, which makes it possible to suppress biasing of physical values such as weight, current, and resistance when the plurality of capacitor elements 20a to 20c are laminated. For this reason, it is possible to provide the capacitor unit 90 that has a balanced shape that is close to a circle when viewed from above and a stabilized electrical performance and also the device 111 on which such capacitor unit 90 has been loaded. Also, as shown in FIG. 29 and FIG. 31, in the capacitor unit 90, the respective elements 20a to 20c are laminated so that most of the area of the substrates 23 overlaps. Accordingly, it is possible to provide the multi-terminal capacitor unit 90 and the device 111 with the unit 90 those have high space efficiency, being compact, and have a large capacity while being a capacitor unit in which a large number of anode portions 21 are laid out in a distributed manner.

The substrate 10 on which the capacitor unit 90 is mounted (loaded) is also a laminated type. As shown in FIG. 29, the substrate 10 is a glass fabric/epoxy resin copper-clad laminated board (glass epoxy substrate) cut into a substantially square shape. Copper foil on the loading-side (packaging side) surface 11 and the mounting-side surface 12 of the substrate 10 is patterned by etching or the like to form the same electrode pattern on both the surfaces 11 and 12. On the loading-side surface 11 of the substrate 10, a plurality of connecting electrodes with the same form as the anode terminals 51 are formed at positions that are opposite the plurality of anode terminals 51 of the mounting-side surface 12 to form anode connecting electrodes 56 for connecting to the anode portions 21 of the capacitor unit 90. Also on the loading-side surface 11 of the substrate 10, a connecting electrode with the same form as the cathode terminal 52 is formed at a position that is opposite the cathode terminal 52 of the mounting-side surface 12 to form a cathode connecting electrode 57 for connecting to the cathode (cathode portion) 22 of the capacitor unit 90.

The anode connecting electrodes 56 and the cathode connecting electrode 57 are disposed around the entire circumference 13 on the loading-side surface 11 of the substrate 10. In the device 111, twelve anode connecting electrodes 56

(which is the same number as the anode portions 21 of the capacitor unit 90) are formed on the four edges 14a to 14d of the loading-side surface 11. The cathode connecting electrode 57 is disposed on a part of the loading-side surface 11 of the substrate 10 that excludes the anode connecting electrodes 56. The anode connecting electrodes 56 and the cathode connecting electrode 57 are separated by insulating gaps 59 in the same way as the mounting-side surface 12.

The respective anode terminals 51 and the anode connecting electrodes 56 are electrically connected by the through electrodes (through holes, via holes) 55 that pass through the substrate 10. The cathode terminal 52 and the cathode connecting electrode 57 are also electrically connected by the through electrodes 55 that pass through the substrate 10. An appropriate number of the through electrodes 55 are provided at an appropriate pitch so as to suppress electrical resistance (connection resistance) between the anode terminals 51 and the anode connecting electrodes 56 and between the cathode terminal 52 and the cathode connecting electrode 57.

In the capacitor unit 90 of the device 111, the three capacitor elements 20a to 20c are stacked in the upward direction 99 and as shown in FIG. 31, the electrode layer 26a and the electrode layer 26b that are opposite each other in the up-down direction are electrically connected directly or by interposing a conductive member such as conductive paste. For example, for the capacitor elements 20a and 20b, the electrode layer 26a of the first functional layer 31 of the capacitor element 20a and the electrode layer 26b of the second functional layer 32 of the capacitor element 20b face one another and are electrically connected. In the respective elements 20a to 20c, the electrode layer 26a of the first functional layer 31 and the electrode layer 26b of the second functional layer 32 are electrically connected as described earlier by the electrode layer 26d of the fourth functional layer 34. These electrode layers 26a and 26d form the cathode portions 22. Accordingly, by stacking the capacitor elements 20a to 20c, the cathode portions 22 of the capacitor element 20a to 20c are connected in parallel. In addition, the electrode layer 26b of the lowermost capacitor element 20a is electrically connected to the cathode connecting electrode 57 of the substrate 10 via conductive paste 61 as shown in FIG. 27.

In the device 111, the total of twelve anode portions 21 of the plurality of laminated capacitor elements 20a to 20c and the twelve anode connecting electrodes 56 of the substrate 10 are electrically connected by bonding using conductive metal wires 62 such as gold wires, copper wires, or aluminum wires. The capacitor unit 90, including the bonding wires, is protected by the packaging resin (molding resin) 3.

By using the capacitor unit 90, it is possible to provide the capacitor device 111 that includes a large number of (i.e., twelve) anode terminals 51. These anode terminals 51 are typically connected in parallel. Alternatively, it is possible to group the anode terminals 51 connected to the anode portions 21 of the capacitor elements 20a to 20c and provide the device as a capacitor device 111 compatible with multiple voltages.

In the capacitor unit 90, a plurality of (in the present embodiment, three) capacitor elements 20a to 20c can be stacked and connected in parallel. This means that it is possible to provide a device 111 with an even larger capacity. Also, the capacitor elements 20a to 20c of the capacitor unit 90 are connected via the electrode layers 26a and 26b that have a wide area that extends on a plane. This means it is possible to provide a capacitor device 111 with low ESR.

In the capacitor unit 90, twelve anode portions 21 are disposed so as to be distributed in twelve different directions. That is, in the respective elements 20a to 20c, currents in four directions flow due to the anode portions 21 disposed in the four corners 39a to 39d, so that in the capacitor unit 90 as a whole, currents flow so as to be distributed in twelve different directions. Since the magnetic fields due to the current flowing in many directions cancel each other out, it is possible to reduce the ESL of the capacitor unit 90. This means it is possible to provide a low ESL capacitor device 111.

In addition, the capacitor unit 90 is a capacitor unit 90 that uses the capacitor elements 20a to 20c equipped with the four anode portions 21 and has the twelve anode portions 21 provided at equal intervals (intervals of an equal angle) around the circumference of a virtual circle 38. Accordingly, with the device 111 where such capacitor unit 90 has been loaded on the substrate 10, it is easy to use a substrate 10 with multiple terminals as the anode connecting electrodes 56 and the anode terminals 51, and since a large number of anode portions 21 are laid out so as to be distributed, the capacitor unit 90, can cope extremely flexibly with a variety of layouts of the multiple terminals of the anode connecting electrodes 56 and the anode terminals 51 on the substrate 10. Accordingly, by using the capacitor unit 90, it is possible to provide a device 111 for surface mounting equipped with a large variety of electrode patterns.

With the capacitor unit 90, the electrode (anode) portions 21 at the corners 39a to 39d of the first functional layer 31 that typically form the anodes can be seen from the upward direction 99 without being obstructed by other elements and can be easily accessed from the upward direction 99. That is, the twelve anode portions 21 of the plurality of capacitor elements 20a to 20c do not overlap one another and the twelve anode portions 21 can be connected from the upward direction 99 by the bonding wires 62 as in the present embodiment. The individual positions out of the twelve anode portions 21 can be easily connected by an appropriate lead frame. The twelve anode portions 21 can also be connected to one another by (direct) bonding wires 62 and a lead frame. Accordingly, it is possible to connect the large number of anode portions 21 using a variety of methods.

In particular, in the capacitor unit 90, since the respective anode portions 21 can be accessed from the upward direction 99, this is suited to connection by wire bonding 62. Accordingly, connection problems due to the lead frame bending or a gap being produced between the lead frame and the anode portions 21 during manufacturing or during use can be prevented from the outset. The plurality of anode portions 21 disposed along the circumference of the virtual circle 38 do not have a constant height with respect to the substrate 10. By using wire bonding 62, it is possible to flexibly absorb differences in the distance (height) between the anode portions 21 and the substrate 10 and provide a multiple terminal capacitor device 111 that is highly reliable.

In the capacitor unit 90, as shown in FIG. 27, for the capacitor element 20c stacked on the uppermost layer, the electrode layer 26b of the second surface (lower surface) 23b of the base 23 contacts the electrode layer 26a of the first surface (upper surface) 23a of the base 23 of the capacitor element 20b therebelow. In the same way, for the capacitor element 20b, the electrode layer 26b of the second surface (lower surface) 23b of the base 23 contacts the electrode layer 26a of the first surface (upper surface) 23a of the base 23 of the capacitor element 20a therebelow. For the capacitor element 20a laminated on the lowermost layer, the electrode layer 26b of the second surface (lower surface) 23b of the base 23 is loaded on the loading-side surface 11 of the substrate 10. As shown in FIG. 30, on the second surfaces (rear surfaces) 23b of the respective elements 20a to 20c, the cathode portion 22 extends in the central part and the respective edges 102a to 102d except for the four corners 39a to 39d. However, the rear surface of the parts corresponding to the anode portions 21 of the four corners 39a to 39d of the second surface 23b of each base 23 is entirely covered by the insulating layer 29b. This means that there is hardly any risk of short circuits between the anode portions 21 and the cathode portions 22, and a plurality of elements 20a to 20c can be laminated by simply stacking the elements 20a to 20c on a lower element or stacking on the substrate 10.

The device 111 is mounted on the printed circuit board 70 as same as that of shown in FIG. 10. The CPU 75 is mounted on the upper surface 71 of the printed circuit board (PCB) 70 and the capacitor device 111 can be mounted in place of the device 1 at a position on the lower surface 72 of the printed circuit board 70 that is opposite the power supply terminals 76 in the central part of the CPU 75. The power supply terminals 76 of the CPU 75 and the anode terminals 51 and 52 of the mounting surface 2 of the device 111 are electrically connected by the plurality of through electrodes 79 that pass through the printed circuit board 70. A multiple-terminal device 111 is even more suited to functioning as a decoupling capacitor or a bypass capacitor.

The device 111 is formed as a capacitor chip for surface mounting that has around 10 mm long and a thickness of around 4 to 10 mm for example, but it depends on the number of laminated elements, is slim and compact relative to its large capacity. The device 111 is, in addition to being a slim, compact capacitor device that incorporates the capacitor unit 90, has a low ESR, a low ESL, and a large capacity. Since the device 111 is a multiple-electrode (multiple terminal) device where a plurality of terminal electrodes 51 are provided on the mounting surface 2, it is possible to replace a conventional application where a large number of capacitors were required with one or a low number of devices 111. This means that the device 111 is favorable for electronic appliances such as information processing terminals like notebook-type personal computers that are becoming increasingly compact and portable information processing terminals like mobile phones and PDAs.

2.4 Various Examples of Capacitor Units

FIG. 32 to FIG. 41 show examples of different devices according to the present invention. In the following, various designs of the capacitor unit (laminated element structure) 90 loaded or to be mounted on the device are shown.

Figure 32:
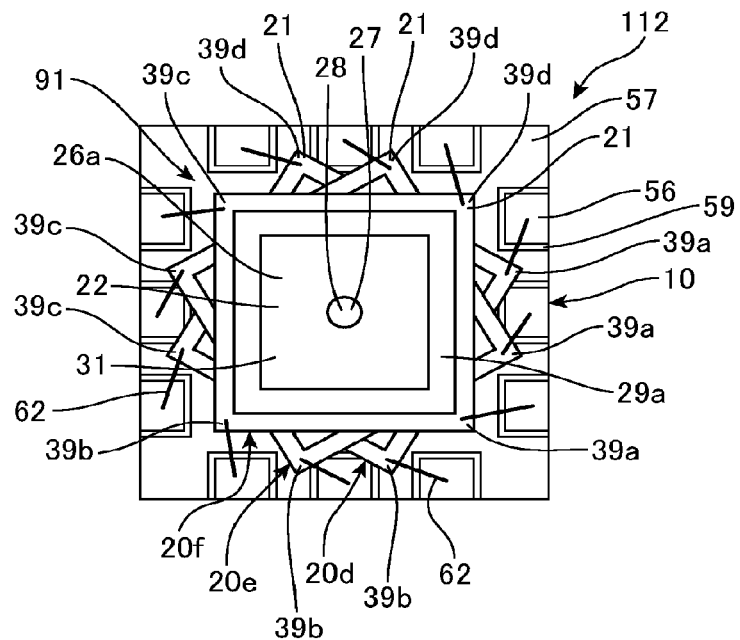
FIG. 32 is a plan view showing a different example of a device in a state where the molding resin has been removed.

FIG. 32 shows a different device 112 when viewed from the upward direction with the molding resin removed. In the capacitor unit 91 shown in FIG. 32, the three capacitor elements 20d, 20e, and 20f are stacked having been rotated by equal angles and the four corners 39a to 39d of the respective elements 20d to 20f can be seen from the upward direction (first direction) to the other elements. The stacked capacitor elements 20d to 20f have the same construction, and since this is the same as the capacitor element 20 shown in FIG. 6 to FIG. 9, description thereof is omitted.

For the capacitor elements 20d to 20f where the entire circumference is the anode portion 21, as shown in FIG. 32, by laminating (stacking) the elements while rotating the elements about the through-hole 27, it is possible to expose the four corner parts 39a to 39d of the anode portion 21 of the capacitor element 20d on the bottom. It is possible to connect to the substrate 10 using the bonding wires 62 and to connect to the anode portions 21 of other elements. This is also the same for the capacitor element 20e stacked middle of the unit 91. By this arrangement of the capacitor unit 91, it is possible to provide a laminated-type capacitor device 112 with a large capacity, a low ESR, and a low ESL.

Figure 33:
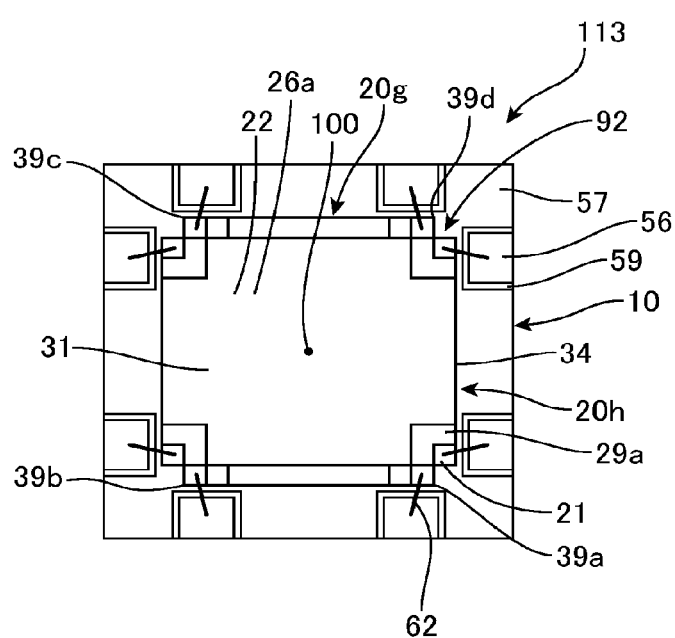
FIG. 33 is a plan view showing a different example of a device in a state where the molding resin has been removed.

FIG. 33 shows a different device 113 when viewed from the upward direction with the molding resin removed. In the capacitor unit 92 shown in FIG. 33, the two capacitor elements 20g and 20h that are rectangular when viewed from above are stacked so as to be perpendicular to one another and the four corners 39a to 39d of the lower element 20g can be seen from the upward direction (first direction, perpendicular direction) without being obstructed by the upper element 20h.

Figure 34:
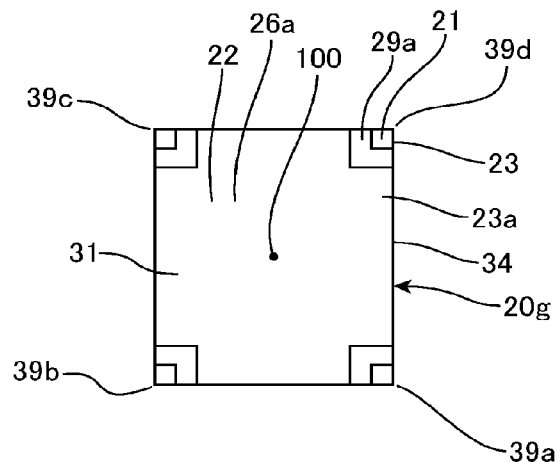
FIG. 34 is a plan view of a capacitor element shown in FIG. 33.

FIG. 34 shows the capacitor element 20g when viewed from the upward direction. The capacitor element 20g has the same construction as the capacitor element 20a described with reference to FIG. 28 to FIG. 31 but differs in that the external form of the base 23 is rectangular. The form of the capacitor element 20 is not limited to square and may be rectangular or another polygon when viewed from above. It is possible to provide a capacitor unit where a plurality of elements 20 are laminated, the anode portions 21 are disposed in the corner parts 39a to 39d of the respective elements 20, the large number of anode portions 21 are distributed around the circumference by combining the elements 20 with the angles of the respective elements shifted so that the corner parts 39a to 39d can be seen from the upward direction (first direction) 99, and where connecting to a substrate using bonding wires or the like is facilitated. In view of space efficiency to provide a large-capacity capacitor device, the form of the capacitor element should preferably be quadrangular such as substantially square or substantially rectangular when viewed from above.

Figure 35:
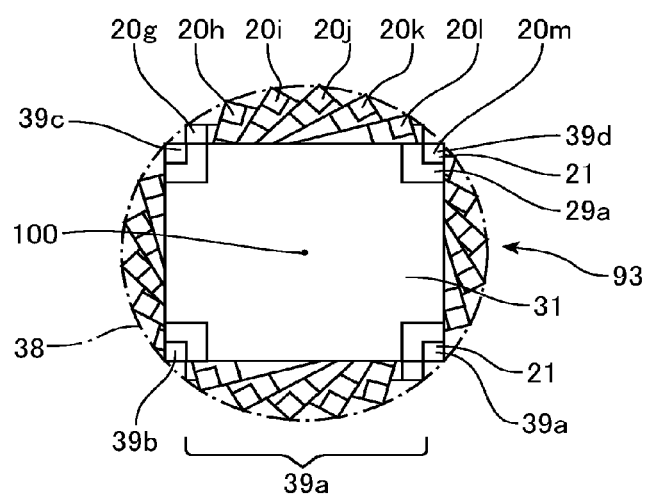
FIG. 35 is a plan view showing a capacitor unit where capacitor elements shown in FIG. 34 have been laminated.

FIG. 35 shows yet another example of a capacitor unit. The capacitor unit 93 shown in FIG. 35 includes seven capacitor elements 20g to 20m that are stacked with the angles therebetween shifted with a pitch of 15 degrees, for example, so that the four corners 39a to 39d of the capacitor element 20 on the bottom can all be seen from the upward direction (the first direction) 99. The number of elements that construct the capacitor unit is not limited to two or three, and like the capacitor unit 93 shown in FIG. 35, it is possible to laminate seven or more elements. With this capacitor unit 93, it is possible to dispose twenty-eight anode portions 21 around the circumference of the virtual circle 38 and to provide a capacitor device including a capacitor unit 93 with an even larger number of terminals.

Figure 36:
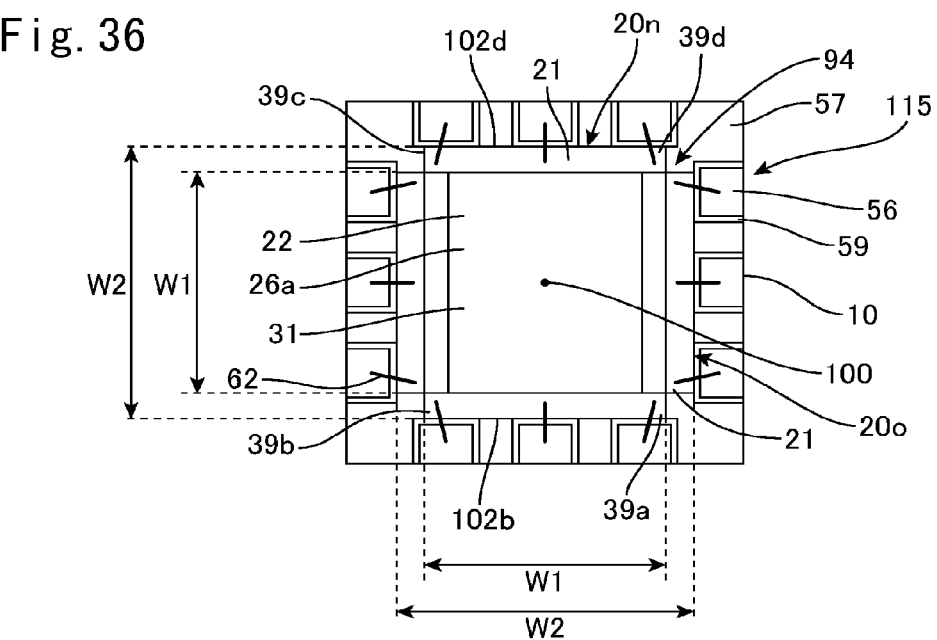
FIG. 36 is a plan view showing a different example of a device in a state where the molding resin has been removed.

FIG. 36 shows a different device 115 when viewed from the upward direction with the molding resin removed. In the capacitor unit 94 shown in FIG. 36, two capacitor elements 20n and 20o that are rectangular when viewed from above are stacked so as to be perpendicular and so that the four corners 39a to 39d of the bottom element 20n can all be seen from the upward direction (the first direction) 99 without being obstructed by the top element 20o.

Figure 37:
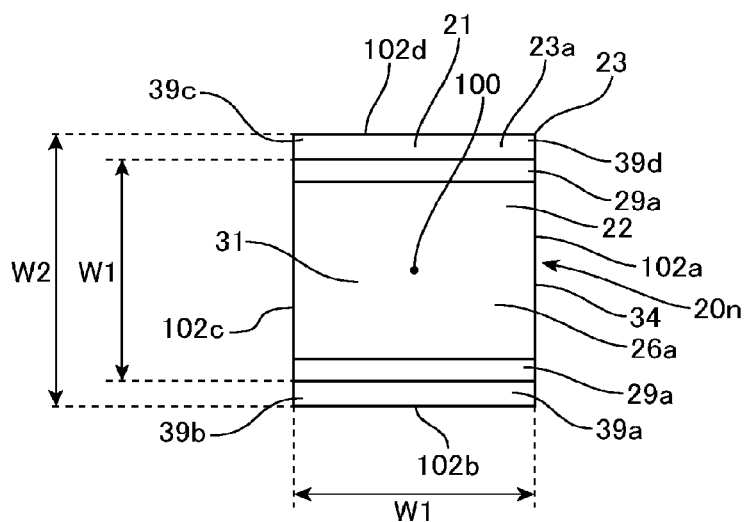
FIG. 37 is a plan view of a capacitor unit element shown in FIG. 36.

FIG. 37 shows the capacitor element 20n when viewed from above. Although the capacitor element 20n has substantially the same construction as the capacitor element 20a described with reference to FIG. 28 to FIG. 31, the capacitor element 20n differs in that the external form of the base 23 is a rectangle formed of the long sides 102a and 102c (length W2) and the short sides 102b and 102d (length W1), and also in that the anode portions 21 of the capacitor element 20n appear on the short sides 102b and 102d that are opposite the first surface 23a of the base 23.

As shown in FIG. 36, the capacitor unit 94 has the capacitor elements 20n and 20o of the construction described above laminated (stacked) having been rotated by 90 degrees around the center point 100. By this stacking of the two capacitor elements 20n and 20o, it is possible to form the anode portions 21 around substantially the entire circumference of the capacitor unit 94. Accordingly, the capacitor unit 94 is capable of being loaded on substrates 10 with a variety of wiring patterns.

Figure 38:
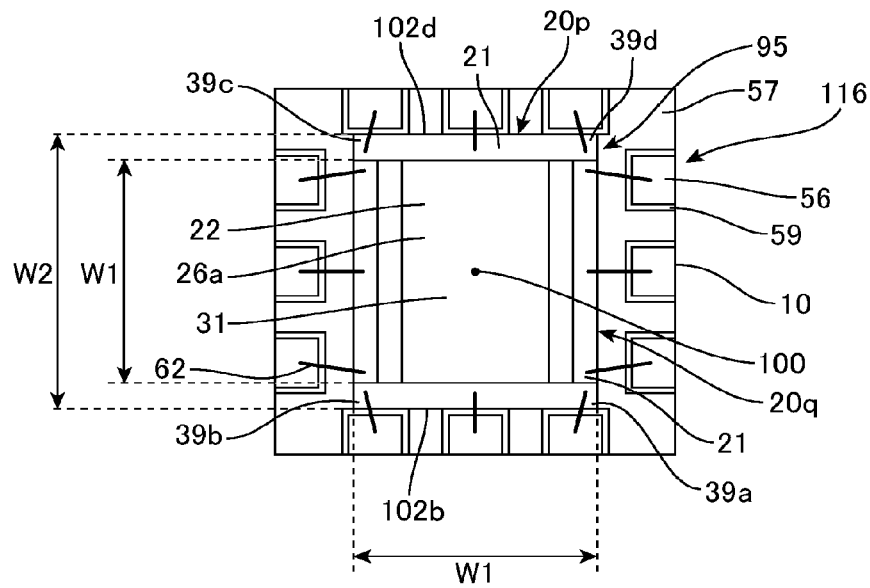
FIG. 38 is a plan view showing a different example of a device in a state where the molding resin has been removed.

FIG. 38 shows another device 116 when viewed from the upward direction with the molding resin removed. The capacitor unit 95 shown in FIG. 38 includes two capacitor elements, one capacitor element (first capacitor elements) 20p is rectangular when viewed from above and the other capacitor element (second capacitor element) 20q is square when viewed from above are stacked. In the capacitor unit 95, the two opposite edges 102b and 102d of the bottom element (first capacitor element) 20p are exposed so as to be seen from the upward direction (first direction) 99 without being obstructed by the top element (second capacitor element) 20q. The top capacitor element (second capacitor element) 20q is smaller than the bottom capacitor element (first capacitor element) 20p. The circumferential edges 103a to 103d of the top capacitor element 20q are disposed inside the circumferential edges 102a to 102d of the bottom capacitor element 20p.

Figure 39:
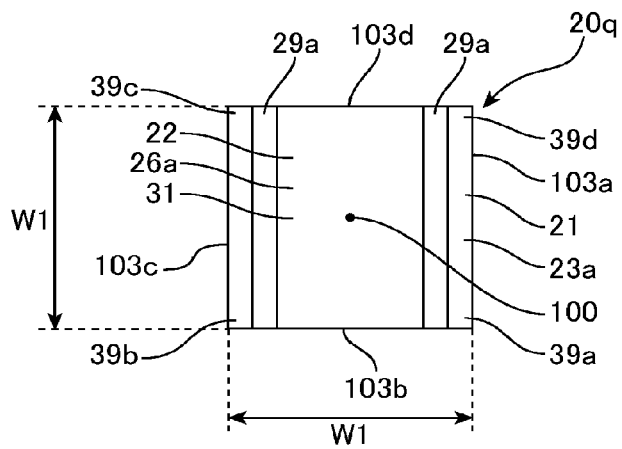
FIG. 39 is a plan view of the capacitor unit shown in FIG. 38.

FIG. 39 shows the top capacitor element (the second capacitor element) 20q when viewed from the upward direction. The capacitor element 20q has substantially the same construction as the capacitor element 20n shown in FIG. 37, and the external form of the base 23 is square so as to include four edges 103a to 103d with a length W1 that is equal to the length W1 of the short edges 102b and 102d of the bottom capacitor element 20p. In addition, on the top capacitor element 20q, the two opposite edges 103a and 103c on the first surface 23a of the base 23 form the anode portions 21.

As shown in FIG. 38, the capacitor unit 95 has the bottom capacitor element 20p and the top capacitor element 20q with the constructions described above laminated (stacked) with the center point 100 in the center. This means that the top capacitor element 20q does not protrude outward from the bottom capacitor element 20p and the entire top capacitor element 20q is loaded on the bottom capacitor element 20p. Accordingly, the entire top capacitor element 20q is stacked in a state where the capacitor element 20q is supported by the bottom capacitor element 20p. Accordingly, the entire top capacitor element 20q is stably supported and has a construction where bonding onto the anode portions 21 is easy, so it is possible to significantly suppress deterioration over time such as connection problems and a drop in yield. In addition, by laminating the two capacitor elements 20p and 20q, the anode portion 21 can be formed around the entire circumference of the capacitor unit 95. Accordingly, the capacitor unit 95 is capable of being loaded on substrates 10 with a wide variety of wiring patterns.

Although the top capacitor element 20q in the present embodiment is square, if the top capacitor element 20q has a size where the circumferential edges 103a to 103d of the top capacitor element 20q are disposed inside the circumferential edges 102a to 102d of the bottom capacitor element 20p, the top capacitor element 20q may be rectangular or another polygon and one edge may be shorter than the length W1 of the short edges.

Figure 40:
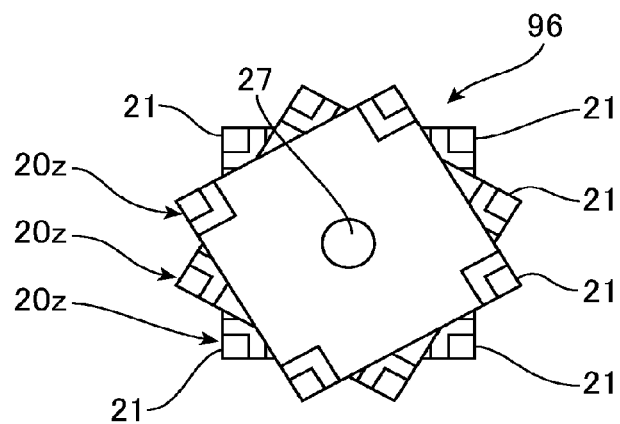
FIG. 40 is a plan view of a different example of a capacitor unit.

FIG. 40 shows yet another example of a capacitor unit. In the capacitor unit 96 shown in FIG. 40, the capacitor elements 20z with four terminals described with reference to FIG. 22 are laminated (stacked) while being rotated about the through-hole 27 in the center. By using the capacitor elements 20z, a capacitor with an even larger capacity is obtained and by using the capacitor elements 20z with the four terminals, a multiple-terminal capacitor unit 96 with five or more terminals is obtained. Accordingly, by loading the capacitor unit 96 on the substrate 10, it is possible to provide a capacitor device that has a large capacity, a low ESR, and a low ESL, and is compatible with substrates 10 with a wide variety of wiring patterns.

Figure 41:
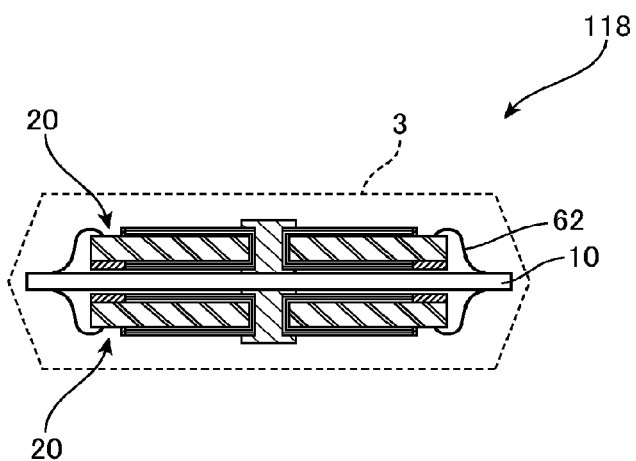
FIG. 41 is a cross-sectional view of a different example of a device.

FIG. 41 shows an example of yet another different device 118. In the device 118, capacitor elements 20 are loaded on both surfaces of the substrate 10. It is possible to load a plurality of capacitor elements 20 not only on one surface of the substrate 10 but also on both surfaces to increase the capacity as a capacitor.

As described above, one type of device included in the present invention is a device including a capacitor element that has a simple construction, where electrical connections between cathode layers formed on an upper surface and a lower surface are improved, and it is also easy to achieve a large area for the cathode layer.

Japanese Laid-Open Patent Publication No. 2002-237431 (Document 3) discloses a technology with the object of providing a solid electrolytic capacitor and a method of manufacturing the same that solve the problem of the ESR properties and ESL properties deteriorating and the high frequency response worsening due to the wiring circuit length increasing when the capacitor is mounted on a substrate together with a large number of other electronic components, and where there is little deterioration in the characteristics due to the connections and superior high frequency response. Document 3 discloses that a solid electrolytic capacitor is composed of an anode including a plurality of through holes in the thickness direction and anode lead portions that are buried inside the through holes of the anode, wherein by using a construction with surface-exposed parts of the anode lead portions as anode terminal portions and a surface-exposed portion of a cathode layer as a cathode terminal portion, the ESR is reduced by alternately laying out the anodes and cathodes on the same surface, the ESL is canceled out, the impedance characteristics at high frequencies can be greatly reduced, and as a result, there is a remarkable improvement in high-frequency response.

In the technology disclosed in Document 3, by increasing the number of through holes, it becomes difficult to achieve sufficient area for the cathode layer of the capacitor element, which makes it difficult to increase the capacitance. Also, it is necessary to separately provide a means for improving the electrical connections between the cathode layer formed on the upper surface and lower surface of the capacitor element.

In a capacitor element including the through-hole electrode disclosed above and a device including such capacitor element, the cathode layers formed on the upper surface and the lower surface of the base substrate can be electrically connected and a drop in the capacity can also be suppressed.

Also, one type of device included in the present invention is a device including a laminated-type capacitor unit that has a large capacity, a low ESR, and a low ESL and is also easy to connect to a substrate or a lead frame.

Japanese Laid-Open Patent Publication No. 2007-116064 (Document 4) discloses a laminated solid electrolytic capacitor produced by laminating a plurality of capacitor element substrates with a metal plate of valve effect in the form of a flat plate with a dielectric oxide film on the surface, an anode portion being formed on one side thereof, a cathode portion composed of a solid electrolyte layer and a cathode lead layer being formed on the other side, and the capacitor element substrates being laminated so that the anode portions alternately face in opposite directions with the cathode portions in the center.

One method of increasing the capacity is to increase the number of capacitor elements that are laminated. By doing so, although the ESR falls, the ESL characteristics are susceptible to deterioration. In addition, it is important that the plurality of laminated capacitor elements can be easily connected to a substrate, a lead frame, or the like.

With the capacitor unit disclosed above where a plurality of capacitor elements are laminated so that a part that includes the four corners of the base can be seen and with a device including such a capacitor unit, it is easy to connect the plurality of laminated capacitor elements to a substrate and it is also possible to improve the ESL characteristics.

Note that the devices, capacitor elements and capacitor units described above are some examples of devices, capacitor elements and capacitor units included in the present invention and the present invention is not limited to the above description. The capacitor element may be another type of capacitor element, such as a non-solid electrolytic capacitor, a ceramic type capacitor, or a film type capacitor. Also, the device for surface mounting according to the present invention is not limited to being combined with a CPU and can be used in combination with another circuit element, for example, a smoothing circuit of a DC-DC converter.

The invention claimed is:

1. A capacitor element comprising:
   a substantially plate-shaped base having a valve effect;
   a first functional layer including a dielectric oxide film, a solid electrolyte layer, and an electrode layer laminated in that order on a first surface of the base, the first functional layer having an outer circumference;
   a second functional layer including a dielectric oxide film, a solid electrolyte layer, and an electrode layer laminated in that order on a second surface of the base;
   a first insulating layer that covers a circumferential edge of the first functional layer on the first surface;
   a second insulating layer that covers a circumferential edge of the second functional layer on the second surface;
   an electrode portion formed by at least part of the first surface of the base being exposed around an entirety of the outer circumferential side of the first insulating layer, such that the electrode portion extends around an entirety of the first functional layer;
   at least one through-hole that passes through the base; and
   a third functional layer provided on an inner circumferential surface of the at least one through-hole that includes a dielectric oxide film, a solid electrolyte layer, and an electrode layer laminated in that order from a side that contacts the base, the electrode layer of the third functional layer electrically connecting the electrode layer of the first functional layer and the electrode layer of the second functional layer,
   wherein the first insulating layer covers the entire circumference of the circumferential edge of the first functional layer and the second insulating layer covers the entire circumference of the circumferential edge of the second functional layer.

2. The capacitor element according to claim 1, wherein the electrode portion includes portions appeared intermittently around the circumferential edge of the first surface.

3. The capacitor element according to claim 1, wherein the at least one through-hole is provided at the center of the base.

4. A device for surface-mounting, comprising:
   the capacitor element according to claim 1;
   a substrate on that the capacitor element is loaded; and
   a packaging resin, the device being integrally molded including the substrate and the capacitor element using the packaging resin,
   wherein the substrate includes a first terminal electrode electrically connected to the electrode portion of the capacitor element and a second terminal electrode electrically connected to at least one of the electrode layer of the first functional layer and the electrode layer of the second functional layer.

5. The device according to claim 4,
   wherein the device includes a bonding wire that connects the electrode portion and the first connecting electrode.

6. A device for surface-mounting, comprising:
   a plurality of capacitor elements, each capacitor element is according to claim 1;
   a substrate on that the plurality of capacitor elements are loaded; and
   a packaging resin, the device being integrally molded including the substrate and the plurality of capacitor elements using the packaging resin, and
   wherein the substrate includes first terminal electrodes electrically connected to the electrode portions of the plurality of capacitor elements and a second terminal electrode electrically connected to at least one of the electrode layer of the first functional layer and the electrode layer of the second functional layer,
   wherein the device includes bonding wires that connect the electrode portions and the first connecting electrodes, and
   wherein the electrode layer of the first functional layer of a lower capacitor element of the plurality of capacitor elements being electrically connected with the electrode layer of the second functional layer of an upper capacitor element of the plurality of capacitor elements.

7. A printed circuit board on which the device according to claim 4 is mounted.

8. An electronic appliance comprising the printed circuit board according to claim 7.

9. A printed circuit board on which the device according to claim 6 is mounted.

10. An electronic appliance comprising the printed circuit board according to claim 9.

11. A capacitor element comprising:
    a substantially plate-shaped base of valve effect;
    a first functional layer including a dielectric oxide film, a solid electrolyte layer, and an electrode layer laminated in that order on a first surface of the base;
    a second functional layer including a dielectric oxide film, a solid electrolyte layer, and an electrode layer laminated in that order on a second surface of the base;
    a first insulating layer that covers a circumferential edge of the first functional layer on the first surface;
    a second insulating layer that covers a circumferential edge of the second functional layer on the second surface;
    an electrode portion formed by at least part of the first surface of the base being exposed on an outer circumferential side of the first insulating layer;
    at least one through-hole that passes through the base; and
    a third functional layer provided on an inner circumferential surface of the at least one through-hole that includes a dielectric oxide film, a solid electrolyte layer, and an electrode layer laminated in that order from a side that contacts the base, the electrode layer of the third functional layer electrically connecting the electrode layer of the first functional layer and the electrode layer of the second functional layer,
    wherein the first insulating layer covers the entire circumference of the circumferential edge of the first functional layer and the second insulating layer covers the entire circumference of the circumferential edge of the second functional layer, wherein the electrode portion appears continuously around the entire circumference of the circumferential edge of the first surface.

* * * * *